United States Patent
Matsutani

(10) Patent No.: US 6,988,764 B2
(45) Date of Patent: Jan. 24, 2006

(54) CROSS CAR BEAM FOR VEHICLE

(75) Inventor: Yo Matsutani, Ashikaga (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/763,254

(22) Filed: Jan. 26, 2004

(65) Prior Publication Data

US 2004/0150251 A1 Aug. 5, 2004

(30) Foreign Application Priority Data

| Jan. 28, 2003 | (JP) | ............................. 2003-018987 |
| Jan. 28, 2003 | (JP) | ............................. 2003-018991 |
| Jan. 30, 2003 | (JP) | ............................. 2003-021781 |
| Jan. 30, 2003 | (JP) | ............................. 2003-021938 |
| Jan. 30, 2003 | (JP) | ............................. 2003-021940 |

(51) Int. Cl.
*B60K 37/00* (2006.01)

(52) U.S. Cl. ...................... 296/193.02; 296/70; 180/90

(58) Field of Classification Search ........... 296/193.02, 296/70; 180/90
See application file for complete search history.

(56) References Cited

U.S. PATENT DOCUMENTS

| 6,155,631 A | 12/2000 | Yoshinaka et al. |
| 6,502,897 B2 * | 1/2003 | Neuss et al. ................. 296/208 |
| 6,517,139 B2 * | 2/2003 | Sutou et al. ................... 296/70 |
| 2002/0153750 A1 | 10/2002 | Feith et al. |
| 2004/0108744 A1 * | 6/2004 | Scheib et al. ................. 296/70 |

FOREIGN PATENT DOCUMENTS

| DE | 299 16 467 U1 | 1/2000 |
| DE | 100 29 813 A1 | 1/2002 |
| EP | 1 415 897 A2 | 5/2004 |
| JP | 10-119684 A | 5/1998 |
| JP | 2001-328421 A | 11/2001 |
| JP | 2002-211441 A | 7/2002 |
| JP | 2002-284018 A | 10/2002 |

* cited by examiner

*Primary Examiner*—Lori L. Coletta

(74) *Attorney, Agent, or Firm*—Foley & Lardner LLP

(57) ABSTRACT

A cross car beam includes a first cylindrical body that extends from a driver's side to an assistant driver's side along a vehicle-width direction, and a second cylindrical body that is provided around an outer periphery of the first cylindrical body on the driver's side. A steering support bracket is formed on the circumferential surface of the second cylindrical body. An air-bag casing is provided on the first cylindrical body on the assistant driver's side. The cross car beam is provided, between the driver's side and the assistant driver's side, with an opening in communication with an air conditioning unit.

21 Claims, 21 Drawing Sheets

FRONT ← → REAR

CROSS CAR BEAM FOR VEHICLE

BACKGROUND OF THE INVENTION

The present invention relates to a cross car beam for a vehicle.

Generally, the cross car beam is arranged inside an automotive instrument panel while fixing both car beam's ends in the vehicle-width direction to pillar members on both lateral sides of a vehicle body or a dash panel. In this state, the cross car beam performs a role to support a steering unit, the instrument panel and so on. Therefore, in view of ensuring beam's rigidity meeting such a role, the cross car beam is generally made from high rigid materials, such as steels and manganese.

Japanese Patent Application Laid-open No. 2002-211441 discloses a cross car beam made of synthetic resin. In the above art, the disclosed cross car beam is provided, on its attachment surfaces to the vehicle body, with additional ribs. Alternatively, the attachment surfaces are increased in thickness. In this way, the attachment surfaces are reinforced to increase the strength of the cross car beam.

In the case of the former cross car beam of steels or the like, it should be noted that the total weight of the cross car beam is increased disadvantageously. While, in the case of the latter cross car beam made of synthetic resin, the usage amount of synthetic resin is increased due to the provision of the thickened ribs or additional ribs, thereby raising the beam's manufacturing cost. Additionally, if a cross car beam is provided, on both sides thereof, with "vent" blowout ports, there arises a possibility that the cross car beam is weaker in the vicinity of the blowout ports.

It is generally noted that the cross car beam has its intermediate part (in the vehicle-width direction) supported by a floor panel etc. on the side of the vehicle body through the intermediary of a support stay. As previously mentioned, in view of the requirements to support the instrument panel and the steering unit, it is necessary to provide a cross car beam with high rigidity. For this purpose, such a cross car beam is provided with a high rigid attachment part for fixation with a support member on the side of the vehicle body. This attachment part is formed by a high rigid material, such as steel and manganese. During assembly, the attachment part of the cross car beam is fixed to an end of the support stay (as the above support member), while the other end of the support stay is fixed to a floor panel of the vehicle body. In this way, the cross car beam is carried by the vehicle body (see Japanese Patent Application Laid-open No. 2002-284018).

It should be noted, however that a supporting structure for a cross car beam in accordance with the above prior art has various problems to be solved. First in the case of an attachment part of steel, the weight of the cross car beam is increased. Second, in the case of an attachment part of manganese, the manufacturing cost of the cross car beam is also elevated. Third when a cross car beam and its attachment part are formed by resinous materials, there arises a possibility that the supporting rigidity of the cross car beam is lowered in comparison with that of the cross car beam made of steel, manganese or the like. Fourth, the cross car beam carries a steering unit etc., an air conditioning unit for feeding warm or cool wind (air) into a vehicle cabin is arranged independently of such a cross car beam (see Japanese Patent Application Laid-open No. 2001-328421).

Japanese Patent Application Laid-open No. 2002-284018 discloses a cross car beam that is equipped, on its peripheral surface, with steering support brackets for supporting a steering unit. During assembly, after forming a main body for the cross car beam, attachment bolts for supporting the steering unit are attached to the steering support brackets of the cross car beam. Thus, the steering support brackets support the steering unit through the attachment bolts. As the steering unit is generally heavy, it is necessary for the steering support brackets to have great mechanical strength. However, as the above-mentioned steering support brackets are thickened in view of ensuring high rigidity corresponding to the required mechanical strength, the cost of components of the cross car beam is apt to rise disadvantageously.

Additionally, it is noted that the above prior art (Japanese Patent Application Laid-open No. 2002-284018) requires fitting the attachment bolts to the steering support brackets after providing the cross car beam with the steering support. As a result, the manufacturing of the cross car beam of the prior art has a tendency to waste time and labor.

As mentioned previously, the cross car beam is arranged inside the instrument panel generally. In connection, the cross car beam is generally provided, on the assistant driver's side, with an air-bag attachment member for installation of an air-bag unit. This air-bag attachment member has to be provided with a designated strength because it may be subjected, during a vehicle collision, to a collision impact transmitted from a passenger through an air bag. As previously mentioned, as the cross ear beam is adapted to support an instrument panel and a steering unit, the cross car beam and the air-bag attachment member are formed by the use of high rigid materials, such as steels (see Japanese Patent Application Laid-open No. 10-11984), which high rigid materials increase the total weight of the cross car beam disadvantageously. Moreover, in the case of forming a cross car beam and an air-bag attachment member of synthetic resin, which is lighter in weight than steel, it is necessary to thicken the cross car beam and the air-bag attachment member in view of their rigidity, thereby raising the material cost in manufacturing.

SUMMARY

In the above-mentioned situations, it is an object of the present invention to provide a cross car beam for a vehicle, which can improve both attaching rigidity and supporting rigidity about the cross car beam without rises in weight and material cost.

Further, it is another object of the present invention to provide a cross car beam with a steering supporting structure, which can save the manufacturing cost and simplify the forming operation.

Still further, it is a further object of the present invention to provide a cross car beam for a vehicle, which can improve the rigidity of the car beam, especially, an air-bag attachment member without rises in weight and material cost.

In order to attain the above objects, a cross car beam of the present invention comprises: a first cylindrical body arranged along a vehicle-width direction so as to extend from a driver's side to an assistant driver's side; a second cylindrical body arranged on the outer circumference of a first cylindrical body's part on the driver's side and wound around the first cylindrical body in a tight manner, thereby providing the cross car beam with a double-pipe structure of the first cylindrical body and the second cylindrical body.

According to the present invention of the above constitution, it is possible to improve both attaching rigidity and supporting rigidity about the cross car beam without rises in weight and material cost.

Preferably, at least either one of an end of the first cylindrical body on an assistant driver's side thereof and an end of the second cylindrical body on a driver's side thereof is provided with an attachment part which is formed to be fixable to a constituent member of a vehicle body, the attachment part having a honeycomb structure.

According to the above constitution, since the attachment part is formed to be a honeycomb structure, it is possible to improve the mechanical strength of the attachment part without rises in weight and material cost. Consequently, even if the cross car beam is made of synthetic resin, it is possible to attach the cross car beam to a constituent of the vehicle body certainly.

The honeycomb structure has a plurality of plate ribs formed so as to extend from an axis of the first cylindrical body or an axis of the second cylindrical body radially.

According to the above constitution, since the attachment part is provided in the form of a honeycomb structure of the plate ribs, it is possible to disperse a torsion torque inputted to the cross car beam into the plate ribs effectively and also possible to transmit the torsion torque to the vehicle body effectively.

The first cylindrical body and the second cylindrical body may be respectively provided, on their circumferential surfaces close to the attachment part, with vent blowout ports that communicate with the interior of the first cylindrical body and the interior of the second cylindrical body, respectively.

According to the above constitution, since the rigidity of the attachment part of the cross car beam is improved, it is possible to suppress the reduction in strength of the vicinity of the attachment part due to the formation of the vent blowout ports.

Further, the cross car beam may further comprises a steering supporting part arranged in the vicinity of the attachment part to support a steering unit of the vehicle.

According to the above constitution, since the rigidity of the attachment part of the cross car beam is improved, it is possible to improve the rigidity of the steering supporting part formed near the attachment part of the cross car beam. Accordingly, the cross car beam is capable of supporting the steering unit certainly in spite of vibrations during a vehicle's traveling.

Preferably, the cross car beam further comprises a rind member adapted so as to envelop the outer periphery of the end of the first cylindrical member on the assistant driver's side, wherein the attachment part is arranged on an end of the rind member and the second cylindrical member is provided, on the end on the driver's side, with another attachment part.

Then, it is possible to shorten the inside cylindrical member as the hollow first cylindrical body thereby suppressing a reduction in rigidity of the cross car beam as a whole and also possible to provide the attachment part with high rigidity owing to the provision of the rind member and the second cylindrical member.

Alternatively, the cross car beam may further comprise a support member, wherein the second cylindrical body is provided, on a periphery thereof, with a rib having an attachment part for the support member, and the support member has one end attached to the attachment part and the other end fixed to a constituent member of a vehicle body, whereby an intermediate part of the cross car beam in a vehicle-width direction is supported by the constituent member through the support member.

According to the above constitution, since the rib is provided with the attachment part for the support member, it is possible to improve the mechanical strength of the above attachment part without rises in weight and material cost about the cross car beam. Consequently, even if the cross car beam is made of synthetic resin, it can be supported by a constituent of the vehicle body certainly.

In the modification, the rib may be formed on an inside end of the second cylindrical body in a vehicle-width direction.

In this case, owing to the formation of the rib on the inside end of the second cylindrical body in the vehicle-width direction, it is possible to improve the strength of the opened end of the second cylindrical body remarkably. Consequently, it is possible to provide the car beam part on the driver's side where rigidity is required, with a double-pipe structure having of the first cylindrical body and the second cylindrical body thereby improving the rigidity of the whole cross car beam and also possible to suppress a reduction in strength of the cross car beam caused by the opening of the second cylindrical body.

In the cross car beam, the attachment part for the supporting member may be arranged, in the rib, on the lower side of the second cylindrical body.

According to the above structure, since the supporting member supports the lower side of the cross car beam, the weight of the cross car beam is transmitted to the supporting member effectively, whereby the cross car beam can be held by the vehicle body certainly.

Alternatively, the first cylindrical body may be provided, on its intermediate part in a vehicle-width direction, with an opening for connection with an air conditioning unit.

Then, since the opening for connection with the air conditioning unit is formed on the center side of the first cylindrical body in the vehicle-width direction, it is possible to utilize part of the cross car beam as an air duct through which warm and cool air from the air conditioning unit is blown into the vehicle cabin.

Further, the first cylindrical body may be provided, on a driver's side thereof, with a steering supporting part to support a steering unit of the vehicle and furthermore, the first cylindrical body's part close to a steering supporting part may be formed to provide the double-pipe structure together with the second cylindrical body.

Then, owing to the provision of the double-pipe structure in the vicinity of the steering supporting part, the same structure allows the heavy steering unit to be supported stably.

Alternatively, the first cylindrical body and the second cylindrical body may be respectively made of synthetic resin. In connection, the strength of synthetic resin forming the second cylindrical body is established larger than that of synthetic resin forming the first cylindrical body.

With the above establishment in strength between the first cylindrical body and the second cylindrical body, it is possible to remarkably improve the strength of a car beam part on the driver's side, especially, the vicinities of the steering supporting part while accomplishing to lighten the whole cross car beam.

Further, the first cylindrical body may be formed by an upper halved member on the upside of the vehicle and a lower halved member on the downside of the vehicle, both of which are welded to each other.

According to the above structure, since the first cylindrical body is formed by both of the upper halved member and the lower halved member, the constitution allows a load applied on the cross car beam to be received and caught effectively. Generally noted that the cross car beam carries a steering unit, an instrument panel, etc., so that an external force (load) therefrom acts downwardly of the vehicle. However, since the first cylindrical body of the car beam is formed by the upper and lower halved members each having respective welding surfaces arranged generally horizontally, the strength of the cross car beam against the external force is remarkably increased at the above welding surfaces.

In the cross car beam, the second cylindrical body may be provided with a steering support member projecting in a fore-and-aft direction of the vehicle and furthermore, the steering support member may be formed by a plate extending from the periphery of the second cylindrical body in the fore-and-aft direction of the vehicle and a sidewall part formed around the plate.

According to the above constitution, it is possible to improve the mechanical strength of the cross car beam against a load, especially, load in the vertical direction of the vehicle. As a result, it is possible to allow the cross car beam to carry a heavy steering unit certainly without rising the material cost for the car beam substantially. When forming the cross car beam by injection molding, the integral arrangement of the steering support member with the cross car beam could improve the attaching strength of the steering support member. In this case, with a simple constitution of an upper molding die and a lower molding die for injection molding, it becomes possible to form the above-constructed steering support member.

In the above cross car beam, a steering unit may be supported on the lower surface of the steering support member, wherein the double-pipe structure's part in the vicinity of the steering support member has a vent blowout port formed in a manner that its upper part opens, thereby blowing out wind against a vehicle cabin.

According to the above constitution, the rigidity of the cross car beam itself is improved by the steering support member. Therefore, despite that the vent blowout port is formed in the cross car beam, it is possible for the cross car beam to maintain its strength against vertical vibrations through the steering unit because the blowout port is not positioned in a vertical wall of the car beam but in its upper surface opposite to the lower surface to carry the steering unit.

In the above-mentioned structure, the steering support member may be arranged on the peripheral surface of the second cylindrical body, on each of the front and rear sides of the vehicle.

According to the above arrangement, owing to the formation of the steering support members on both front and rear sides of the cross car beam, it can support the steering unit uniformly.

Alternatively, in the cross car beam, the steering support member may have a fastening member molded in one body therewith to project downwardly, and the steering unit is attached to the fastening member, thereby supporting the steering unit through the steering support member.

Then, owing to the integral formation of the steering support member with the fastening member, there is no need to establish an additional process to attach the fastening member to the steering support member, whereby the forming operation of the cross car beam can be simplified.

In the cross car beam of the present invention, the first cylindrical body may be formed by halved members and further, one of the halved members may be provided with an air-bag attachment member.

Additionally, in the above modification, it is preferable that the first cylindrical body may be formed so that its upper surface on an assistant driver's side becomes higher than the upper surface on a driver's side, the first cylindrical body is formed by an upper halved member on the upside of the vehicle and a lower halved member on the downside of the vehicle, both of which are welded to each other, the air-bag attachment member is provided on the assistant driver's side of the lower halved member and that a parting line between the upper halved member and the lower halved member is arranged, on the driver's side, at the central part of the first cylindrical body in a vertical direction of the vehicle and also arranged, on the assistant driver's side, above the air-bag attachment member.

According to the above constitution, since the parting line on the assistant driver's side is arranged above the air-bag attachment member, it is possible to form the air-bag attachment member itself in one body, whereby its strength can be improved. Consequently, it is possible to provide the first cylindrical body with enough rigidity to cope with an external load that might be inputted to the air-bag attachment member through an air bag at a vehicle collision.

Further, the parting line on the assistant driver's side may be arranged along the upper surface of the first cylindrical body.

Then, due to the above arrangement of the parting line, it is possible to make a thickness of the upper halved member generally constant. Therefore, when forming the halved members by injection molding of molten resin, it becomes possible to make the flowing of molten resin smooth in the upper halved member, thereby avoiding an occurrence of molding defects, such as shrinkage and cavity.

Alternatively, the upper surface of the first cylindrical body on the assistant driver's side may form a part of a surface of an instrument panel.

According to the above constitution, it is possible to constitute the upper surface of the upper halved member, which is excellent in terms of molding quality, as part of the surface of the instrument panel. Consequently, it is possible to lighten the instrument panel with a reduction of material cost.

These and other objects and features of the present invention will become more fully apparent from the following description and appended claims taken in conjunction with the accompany drawings.

DETAILED DESCRIPTION OF THE PREFERRED EMBODIMENT

Referring to accompanying drawings, various embodiments of the present invention will be described below.

[1st. Embodiment]

Figure 1:
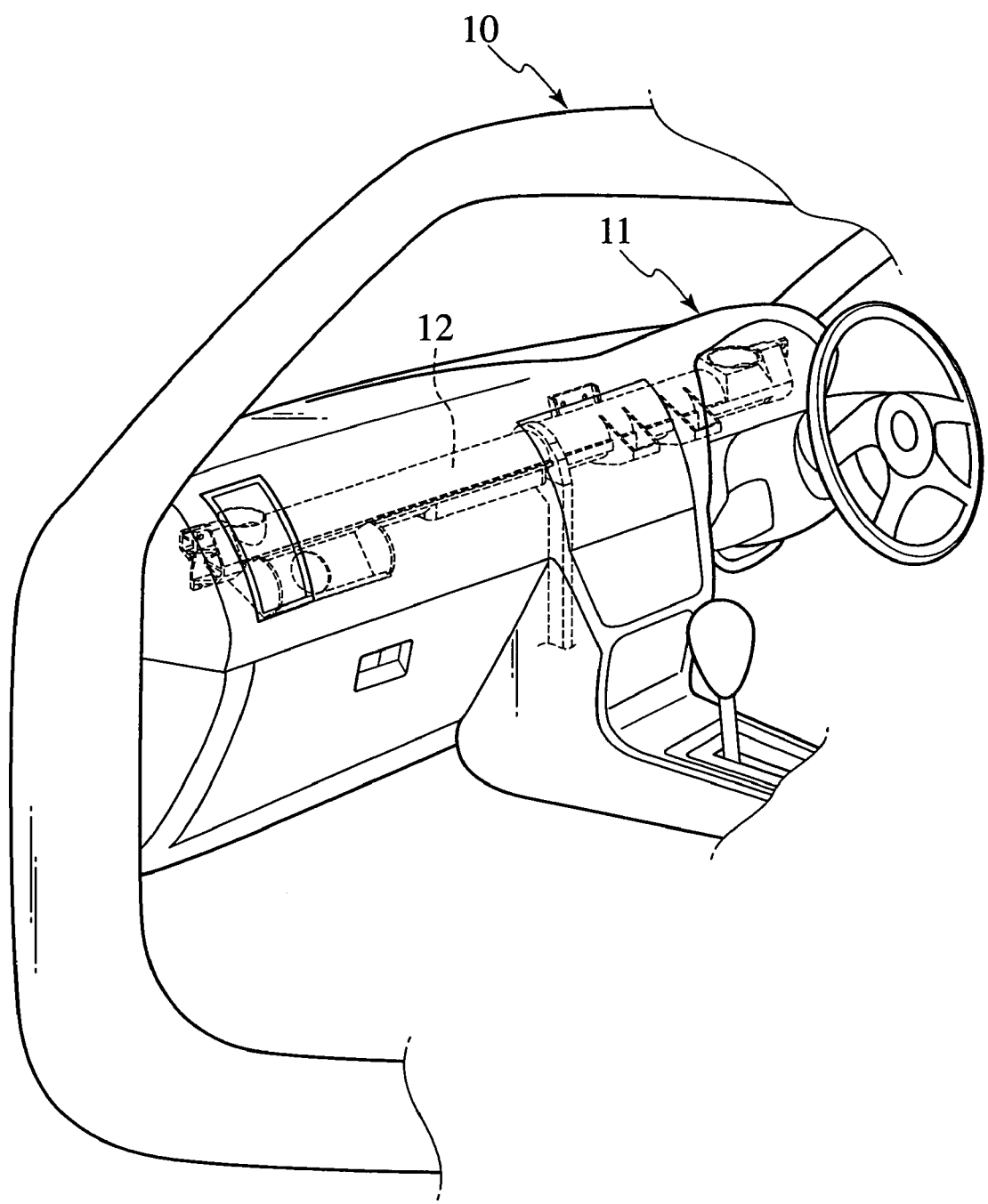
FIG. 1 is a perspective view of a front part of a vehicle body where a cross car beam of the first embodiment of the present invention is arranged.

FIG. 1 shows the interior of a vehicle cabin of a vehicle body 10 on the application of a cross car beam of the first embodiment of the invention.

On the front side of the vehicle cabin, there is arranged an instrument panel 11. Inside the instrument panel 11, in other words, on the front side of the panel 11, a cross car beam 12 is arranged so as to extend from the driver's side (or driver's seat side) to the assistant driver's side (or assistant driver's seat side) of a vehicle.

Figure 2:
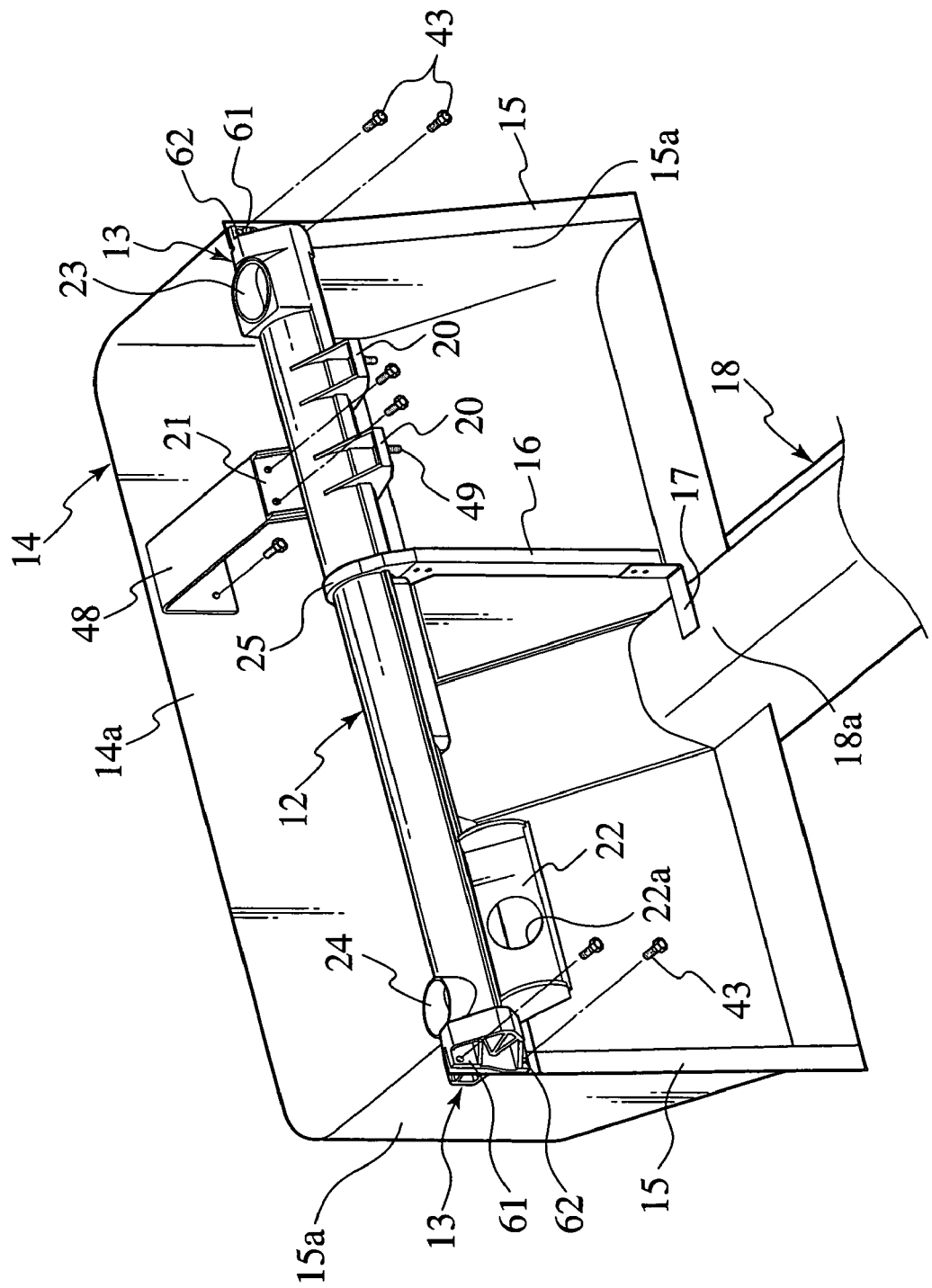
FIG. 2 is a perspective view showing the mount arrangement of the cross car beam where an instrument panel of FIG. 1 is detached.
Figure 6:
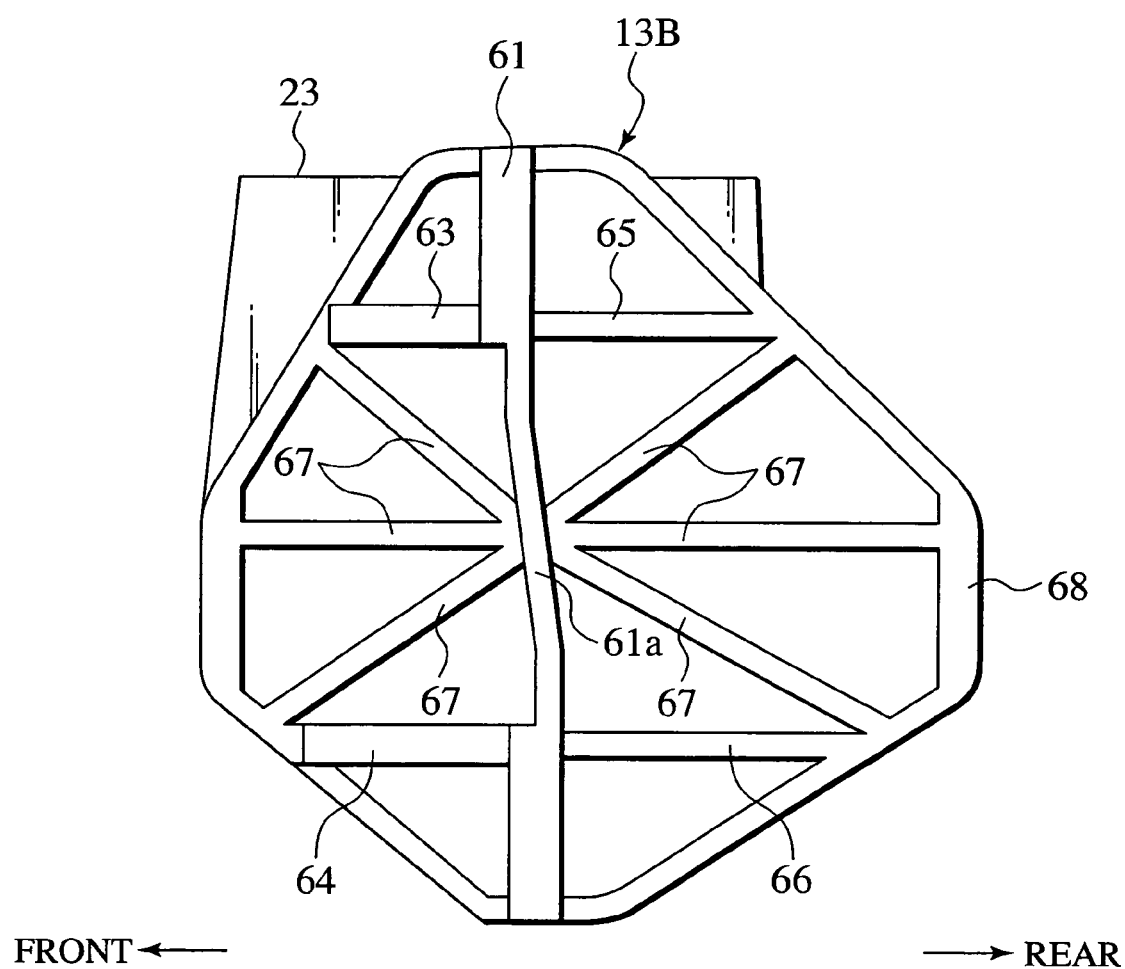
FIG. 6 is a side view of the attachment of FIG. 5, viewed from the right-hand side.

As shown in FIG. 2, the cross car beam 12 is provided, on both right and left sides thereof, with attachment parts 13, 13 each of which has a fitting face 61 and a flange 13B (FIG. 6). The fitting faces 61 are respectively provided with bolt holes 62. A dash lower panel 14 is arranged in front of the cross car beam 12. The dash floor panel 14 is provided, on both sides thereof in a vehicle-width direction, with side panel parts 15a, 15a each of which has a flange 15 folded to extend from their rear edges of the panels 15a, 15a to an out-vehicle direction. The above attachment parts 13, 13 of the cross car beam 12 are fastened to the attachment flanges 15, 15 by means of bolts 43. Additionally, the cross car beam 12 is supported, on its center side, by an upper surface 18a of a tunnel part 18 of a floor panel through a support stay 16 and a L-shaped attachment bracket 17.

On the driver's side of the vehicle (e.g. the right-hand side of FIG. 2), an attachment bracket 21 is fixed to the outer circumferential face (front-side) of the cross car beam 12. The attachment bracket 21 is attached to a rear face 14a of the dash lower panel 14 through a support bracket 48 having U-shaped section in side view.

Figure 3:
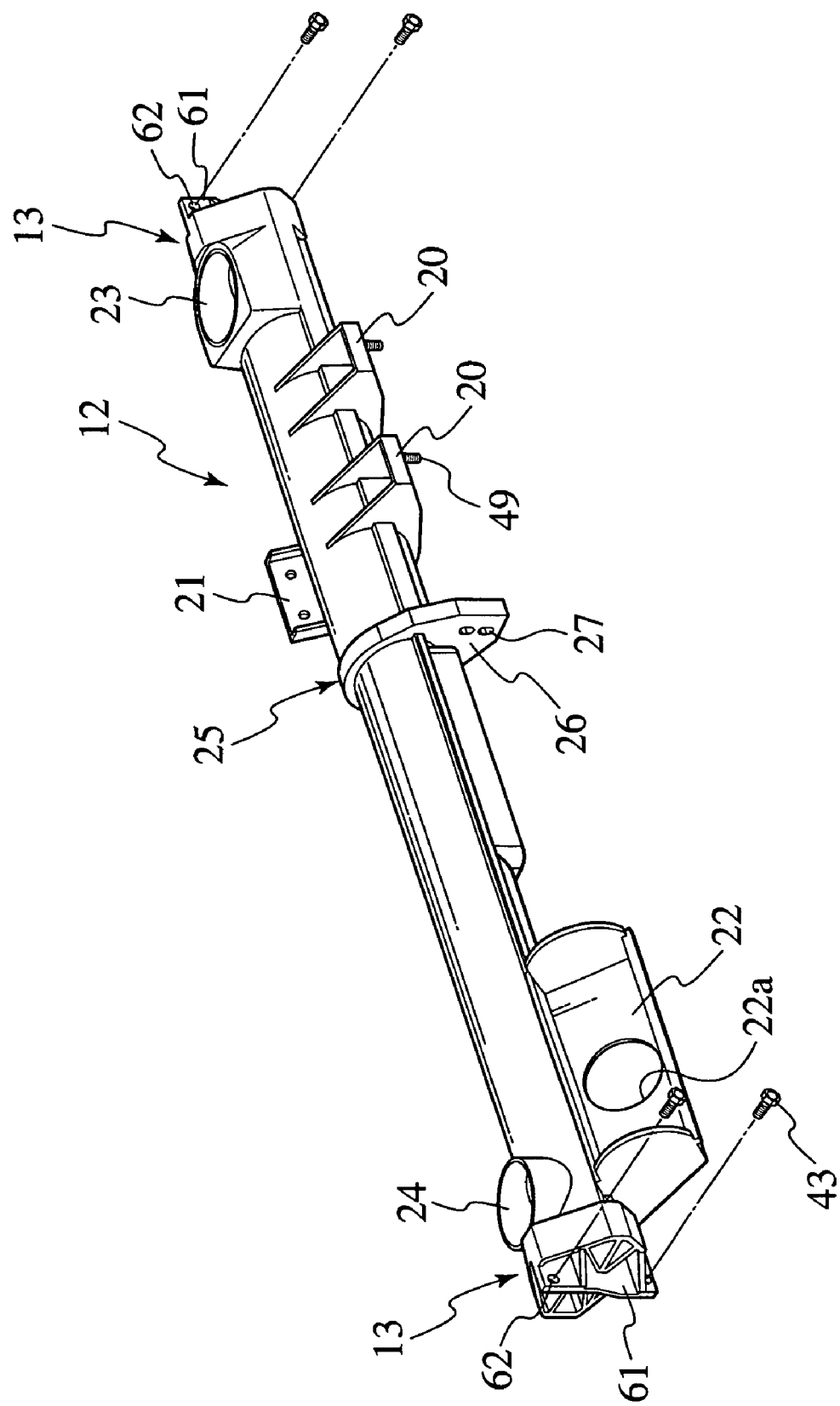
FIG. 3 is a perspective view showing the whole cross car beam of the embodiment in accordance with the first embodiment of the invention.

FIG. 3 is a perspective view of the cross car beam 12 of this embodiment. The cross car beam 12 is provided, on the driver's side, with steering support brackets (i.e. steering support parts) 20, 20 for supporting the steering unit on the outer circumferential face (rear-side) of the beam 12. As previously mentioned, the cross car beam 12 is provided, on the front side, with the attachment bracket 21 for fixing the cross car beam 12 to the dash lower panel 14. Each of the steering support brackets 20, 20 has a tap-end stud bolt 49 formed to project downwardly by insert molding. On the other hand, the cross car beam 12 is provided, on its rear face on the driver's side, with an air-bag casing 22. On both right and left ends of the cross car beam 12, cylindrical vent "blowout" ports 23, 24 are formed on the upper surface of the beam 12. The cross car beam 12 has a rib 25 formed in the vicinity of the beam's center in the vehicle-width direction and also on the driver's side, for connection with the support stay 16. In the lower portion of the rib 25, an attachment part 26 is provided for its attachment with the support stay 16. Further bolt holes 27 are formed in the attachment part 26, for engagement with the support stay 16. In assembly, the upper end of the support stay 16 is fastened to the bolt holes 27 by means of bolts.

Figure 4:
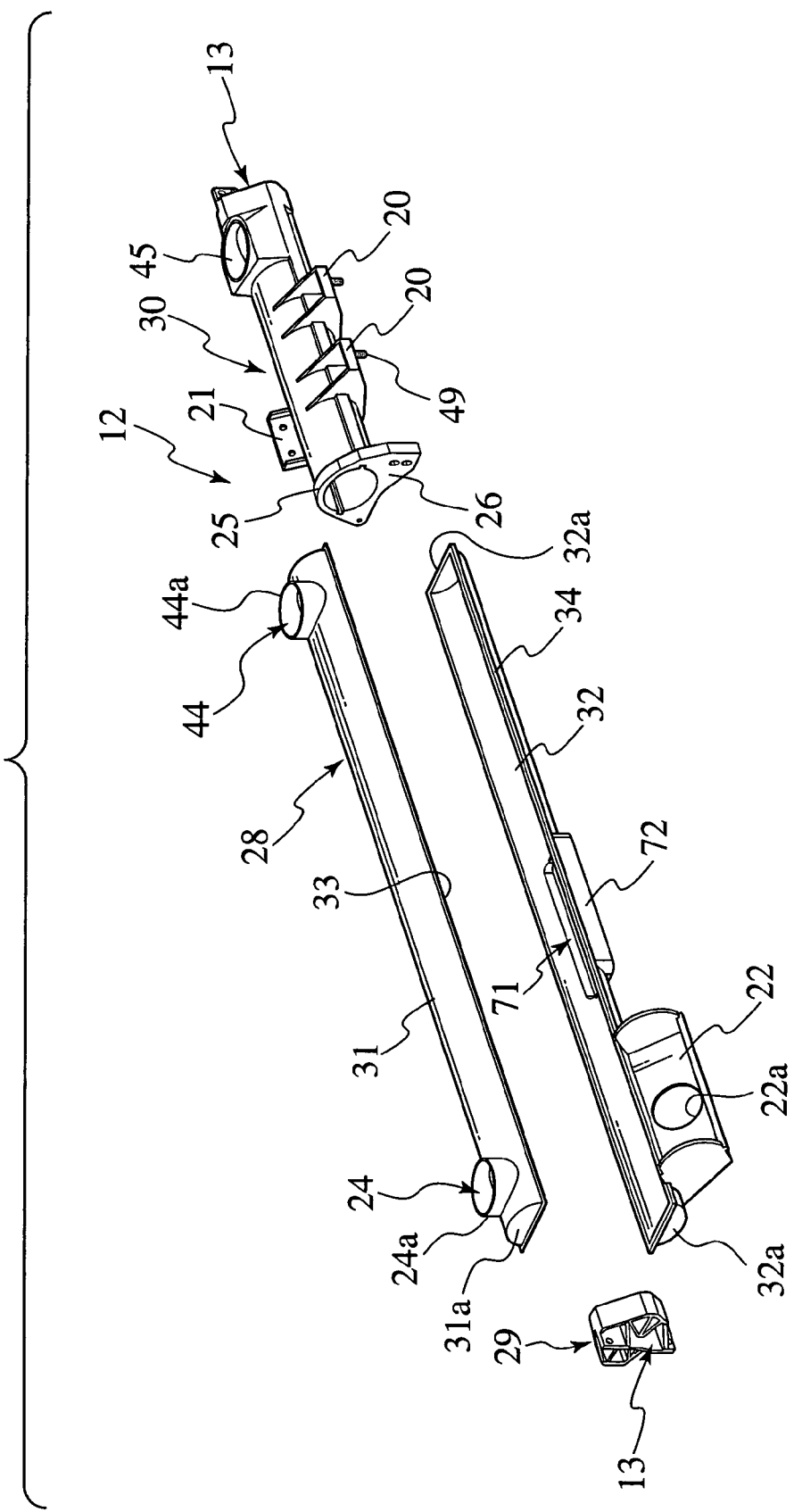
FIG. 4 is an exploded perspective view of the cross car beam in accordance with the first embodiment of the invention.

FIG. 4 is an exploded perspective view of the cross car beam 12 of the embodiment.

The cross car beam 12 includes a first cylindrical body 28, which made of resin and which is molded first. A lid member 29, which is also made of resin, is molded outside one end of the body 28 on the assistant driver's side by enveloped casting. A second cylindrical body 30, which is also made of resin, is molded outside another end of the body 28 on the driver's side by enveloped casting.

The cylindrical body 28 has an upper halved member 31 that has a substantial U-shaped section and a lower halved member 32 that has a substantial U-shaped section throughout. The halved members 31, 32 have their longitudinal ends closed by vertical walls 31a, 32a, respectively. The upper halved member 31 is provided, on both sides in the longitudinal direction, with openings 44, 24 corresponding to the vent "blowout" ports 23, 24. The openings 44, 24 are surrounded by upwardly projecting flanges 44a, 24a. The lower halved member 32 is provided, at its intermediate part in the vehicle-width direction, with a lower opening 71, which is connected to a not-shown HVAC (Heating, Ventilating and Air-Conditioning) system. The opening 71 is surrounded by a flange 72 that extends downwardly. On the rear surface of the lower halved member 32, the above-mentioned air-bag casing 22 is formed in one body with the member 32, in the form of a bottomed box. On the bottom of the casing 22, an opening 22a is formed to accommodate a not-shown disk-shaped inflator for air-bag.

On the other hand, the cylindrical body 30 is provided, inside in the vehicle-width direction, with an opened end around which the rib 25 is formed over the whole circumference so as to project radially outward of the cross car beam 12. On the underside of the rib 25, the attachment part 26 is formed so as to project downwardly. In assembling, the support stay 16 is fastened to the attachment part 26 of the rib 25. The second cylindrical body 30 is provided, at its outer end in the vehicle-width direction, with the attachment part 13 extending vertically. Near the attachment part 13 and on the top of the second cylindrical body 30, a blowout opening 45 is provided with an upwardly projecting flange. On the rear surface of the second cylindrical body 30, in the vicinity of the opening 45, the above steering support brackets 20, 20 in pairs are arranged in the form of bottomed boxes that open upwardly. The attachment bracket 21 is formed on the front surface of the second cylindrical body 30 in the vicinity of the opening 45. These brackets 20, 20 and 21 are integrally formed with the second cylindrical body 30. It is noted that the vent "blowout" port 23 of FIG. 3 has the blowout opening 44 of the first cylindrical body 28 and the blowout opening 45 of the second cylindrical body 30, thereby providing a tight double-pipe structure.

Figure 5:
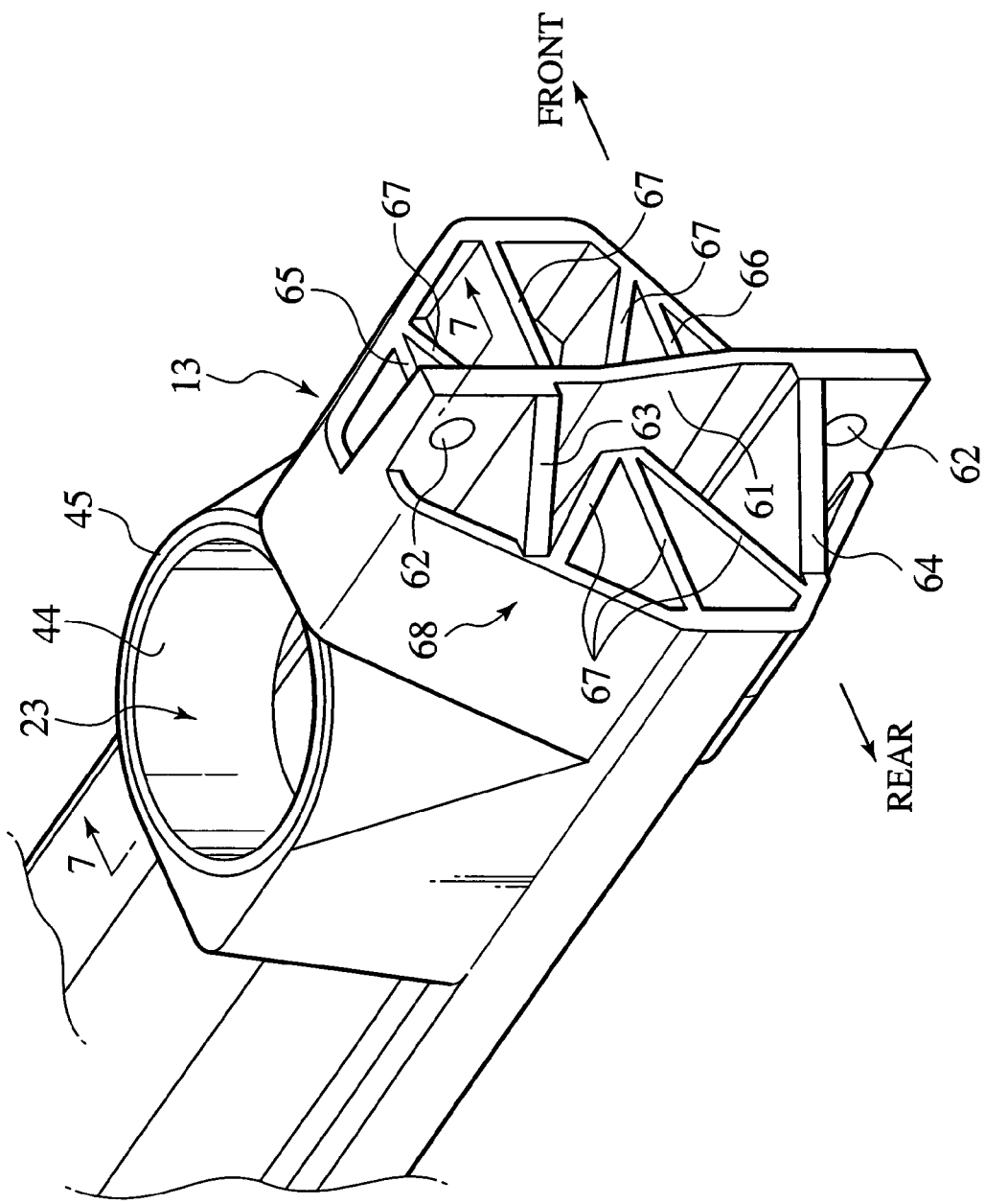
FIG. 5 is a perspective view of the cross car beam of the first embodiment, showing its attachment of the driver's seat side.

As mentioned before, the cross car beam 12 is provided, on both (left and right) sides thereof, with the attachment parts 13, 13. FIG. 5 is a perspective view showing the attachment part 13 formed on the car beam end on the driver's (right) side. FIG. 6 is a side view, also viewed from the right side of FIG. 5.

As shown in these figures, the attachment part 13 is in the form of a honeycomb structure. That is, the attachment part 13 includes a plurality of later-discussed ribs 63–67, which are formed in a recess opening outward in the vehicle-width direction. This recess is defined by a substantially-octagonal outer circumferential wall (surface) 68. Owing to the provision of the ribs 63–67 the interior of the recess is divided into a plurality of small spaces. In detail, at the center of the attachment part 13 in the fore-and-aft direction of the vehicle, the fitting face 61 (also called an attachment wall or surface) is formed so as to extend in the axial direction of the cross car beam 12 and also vertically. Further, the attachment wall 61 is also formed so as to project from the recess outwardly in the vehicle-width direction. Reinforcing ribs 63, 64 are formed to extend from upper and lower parts of the attachment wall 61 rearward of the vehicle, respectively. The reinforcing ribs 63, 64 are also formed so as to project from the recess. The outer edges of the ribs 63, 64 that project from the recess are removed off obliquely, so that the resulting rear ends of the outer edges terminate at the outer circumferential wall 68. In the recess part preceding the attachment wall 61, support ribs 65, 66 are formed so as to extend from the wall 61 forwardly in level with the reinforcing ribs 63, 64, respectively. In the attachment wall (part) 61 projecting from the recess outward in the vehicle-width direction, an area having no rib is defined on the front side of the wall 61 to allow it to overlap with the attachment flange 15 (FIG. 2). In the attachment wall 61, its parts that are equipped with the bolt holes 62 are large in thickness, while the intermediate part between the reinforcing ribs 63, 64 is small in thickness.

In the above recess, as shown in FIG. 6, a plurality of fixing ribs 67 are formed so as to extend from a radial center (axis) 61a of the attachment wall 61 in the radial direction. Extending in the radial direction of the attachment part 13, these fixing ribs 67 are fixed to the inner face of the outer circumferential wall 68. Note that respective leading ends of the attachment part 61 and the ribs 63–67 terminate at flat portions of the octagonal-shaped circumferential wall 68. Additionally, the attachment part 13 is joined, on its center side in the vehicle-width direction, to the blowout opening 45 outside the vent "blowout" port 23, thereby reinforcing it.

In the shown embodiment of FIG. 6, the contour of the attachment part 13 is shaped to be substantially octagonal. However, unlimitedly to this embodiment, the attachment part 13 may be shaped to be polygonal, circular and oval. The above ribs 63 to 67 are in the form of plate ribs.

Figure 7:
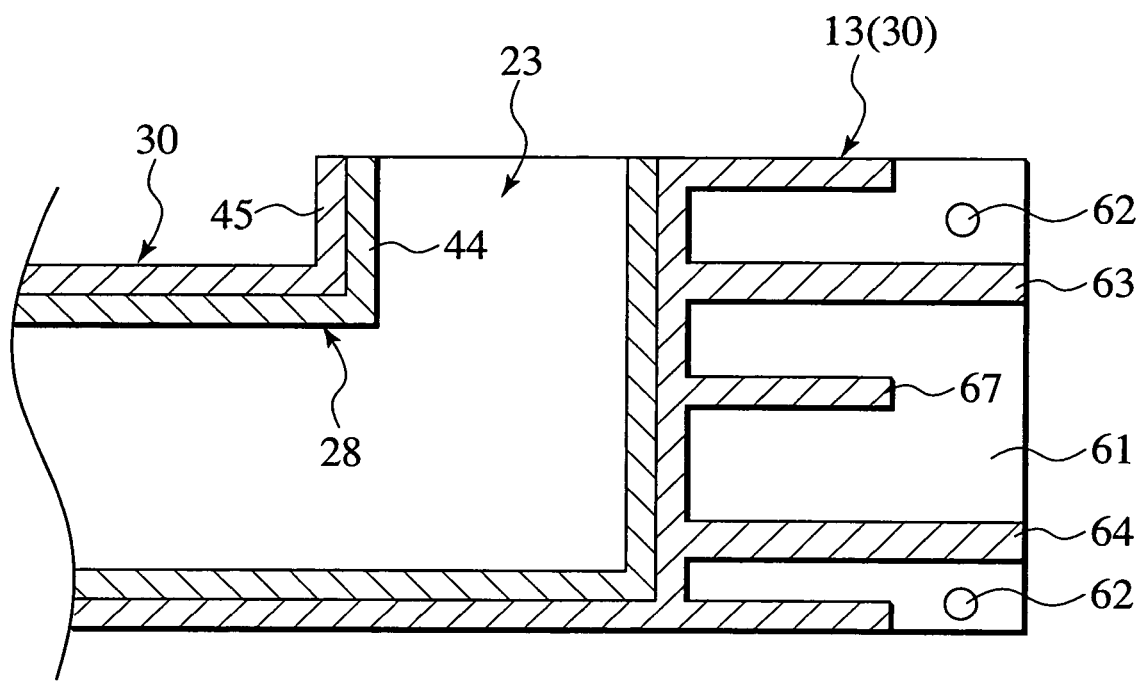
FIG. 7 is a sectional view taken along a line 7—7 of FIG. 5.

As shown in FIG. 7, which is, a sectional view taken along a line 7—7 of FIG. 5, the above attachment part 13 is a part of the second cylindrical body 30. The second cylindrical body 30 is made of high rigid resin and molded on the circumferential side of the first cylindrical body 28 by enveloped casing.

Figure 8:
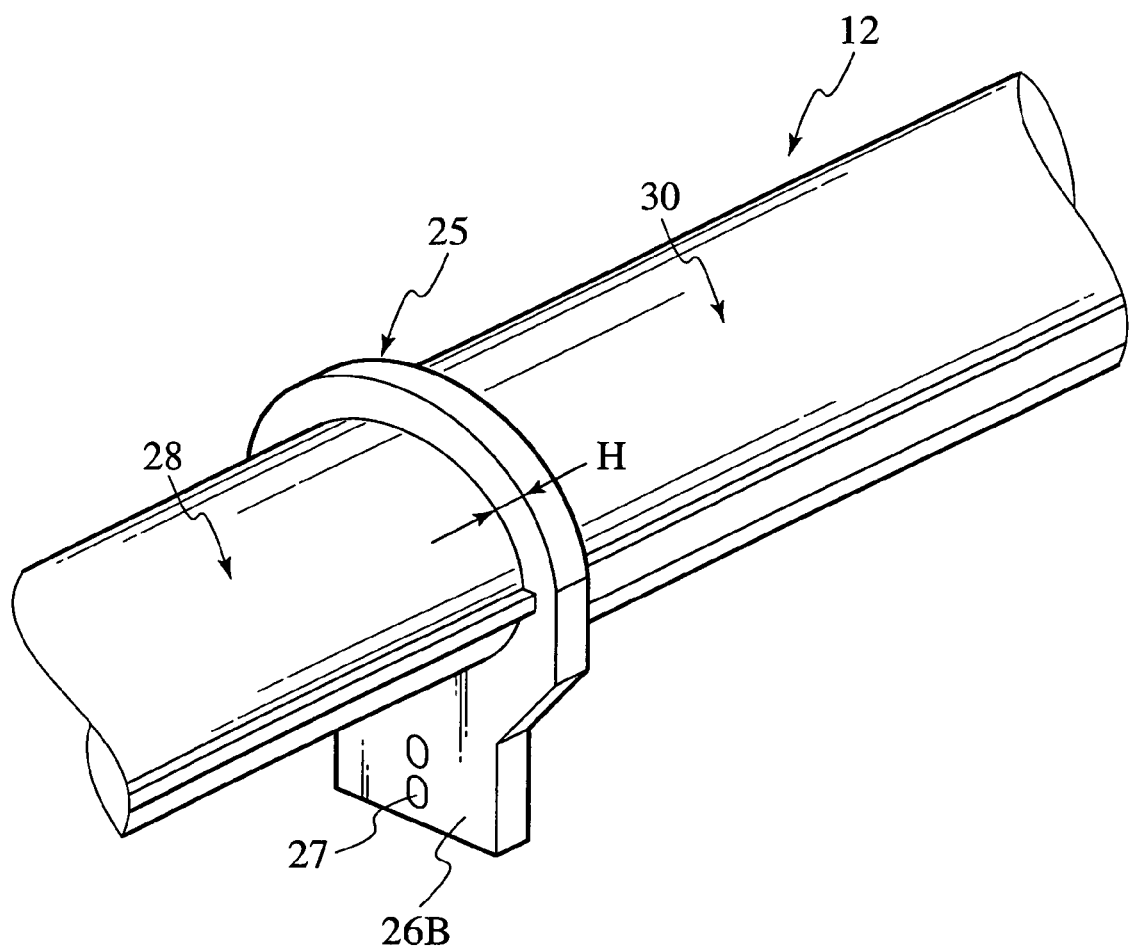
FIG. 8 is an enlarged perspective view of the cross car beam of FIG. 3, showing a modification of the attachment for a holder member.

FIG. 8 shows a modification of the attachment part for the supporting member. FIG. 8 is a perspective view of the cross car beam, showing an attachment part 26B just below the rib 25, in other words, under the axis of the cross car beam 12. As shown in the figure, in the vicinity of the center part of the cross car beam 12 in the vehicle-width direction, a so-called brim-shaped rib 25 is formed over the whole periphery of the cross car beam 12 continuously and integrally. This rib 25 is shaped so as to have a small height H on the upper side of the cross car beam 12 and also the attachment part 26B on the lower side of the car beam 12. The attachment part 26B is provided with the bolt holes 27. In assembly, the upper end of the support stay 16 is secured to the attachment part 26b with the engagement of bolts (not shown) with the bolt holes 27.

The forming method of the cross car beam 12 will be described in brief.

First of all, it is performed to mold the cylindrical body 28. Previously, by injection molding, the upper halved member 31 and the lower halved member 32 (see FIG. 4) are made from different resins independently. Thereafter, by welding respective peripheries 33, 34 of the members 31, 32 to each other in vibrations, the hollow cylindrical body 28 is completed.

Figure 9:
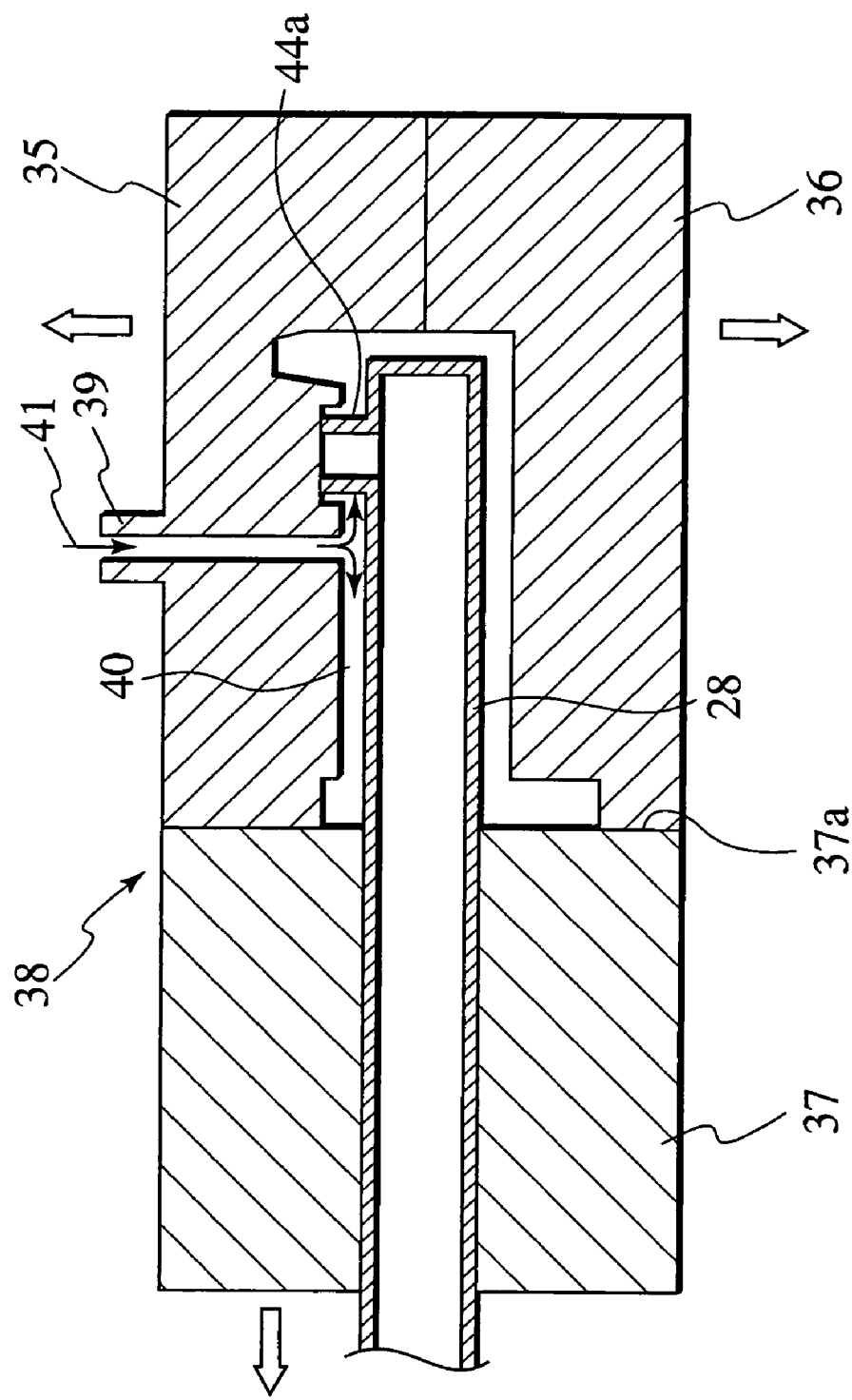
FIG. 9 is a sectional view of a molding die for molding the cross car beam of the first embodiment.

Next, by enveloped casing, the lid member 29 and the second cylindrical body 30 of resins are molded on the circumferences of both ends of the first cylindrical body 28 respectively. The second cylindrical body 30 can be formed in enveloped casing by using a molding die 38 composed of a top die 35, a bottom die 36 and a side die 37, as shown in FIG. 9.

Upon positioning the previously-formed first cylindrical body 28 in the molding die 38, when moving the top die 35, the bottom die 36 and the side die 37 to complete the molding die 38, a cavity 40 is defined between the first cylindrical body 28 and the inner surface of the molding die 38. Then, molten resin 41 is poured into the cavity 40 through a gate 39 that is formed in the top die 35. Subsequently, the cavity 40 is filled with the molten resin 41. From this state, as the molten resin 41 hardens in the cavity 40, the second cylindrical body 30 is formed on the circumference of the first cylindrical body 28 by enveloped casting. Thereafter, when the top die 35, the bottom die 36 and the side die 37 are moved to open the molding die 38, the cross car beam 12 of this embodiment is finished. Here, it is desirable that the above molten resin 41 (in solid state) is stronger than the resin that forms the first cylindrical body 28. For example, a molten resin that is mixed with fibers is preferable for the second cylindrical body 30.

Figure 10:
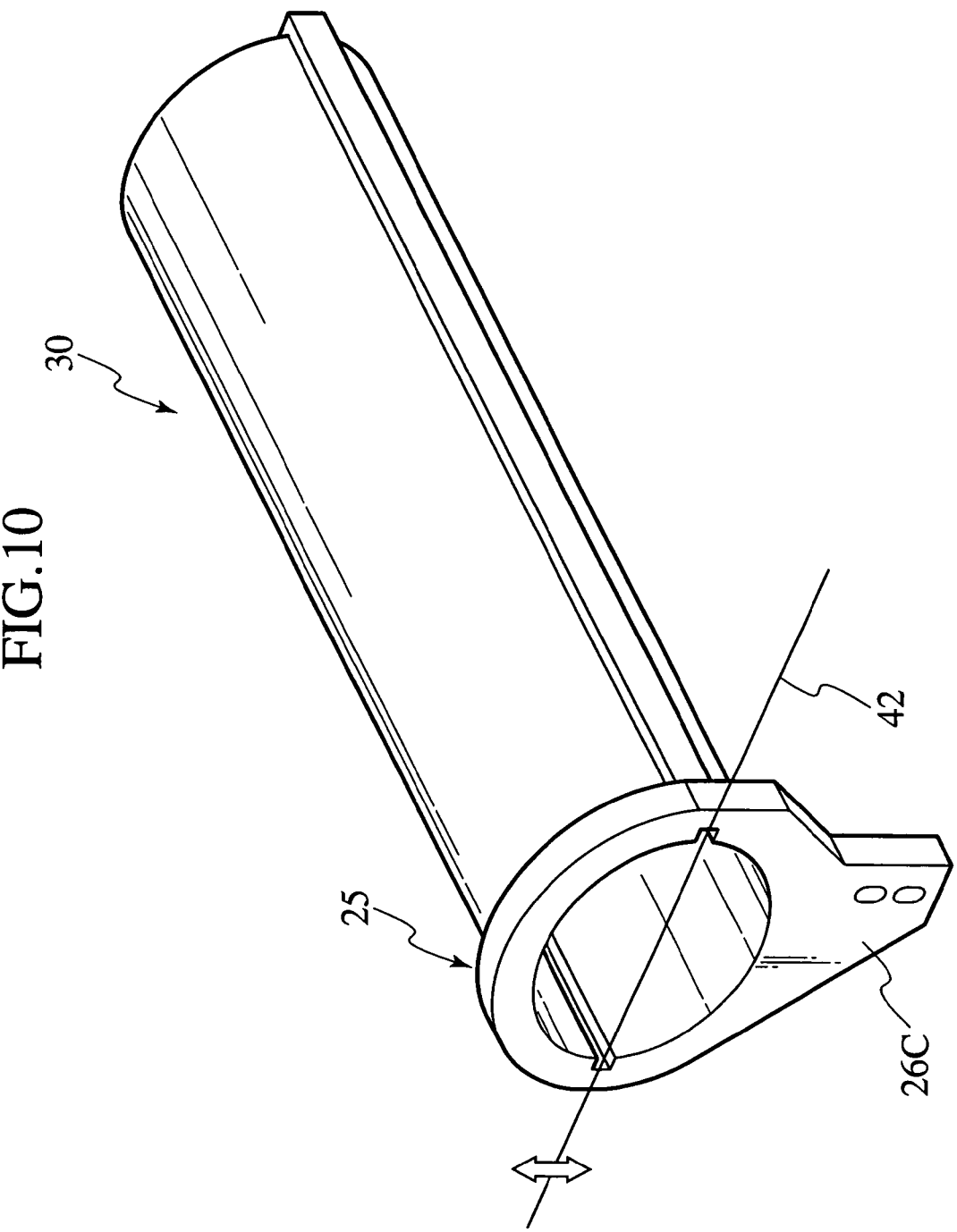
FIG. 10 is a perspective view showing a parting line of the cross car beam of the first embodiment.

Further, the molding die 38 is opened by moving the top die 35 and the bottom die 36 up and down on the boundary of a substantially-horizontal parting line 42 respectively, as shown with arrow of FIG. 10. Noted that reference numeral 26C designates an attachment part as a modification of the attachment part 26B.

According to the attachment structure of the cross car beam of this embodiment, since the attachment parts 13, 13 of the cross car beam 12, which are required to have high rigidity in view of their attaching to the dash lower panel 14 of the vehicle body, are in the form of honeycomb structures, it is possible to fasten the cross car beam 12 to the vehicle body certainly. Further, in spite of the vent "blowout" port 23 as shown in FIG. 5, the strength in the vicinity of the opening 23 can be maintained by the above honeycomb structure.

Hitherto, there is defined a dead space between the vent "blowout" port 23 and the attachment wall (surface) 61. According to the embodiment, it is possible to make effective use of the above space for the attachment part 13 of high rigidity resulting from the honeycomb structure. Again, owing to the honeycomb structure including a plurality of ribs, it is possible to transmit a torsion torque inputted to the cross car beam 12 to the vehicle body while effectively dispersing the torque to the ribs 63 to 67 (see FIG. 6).

Note that as the vent "blowout" port 23 is formed by the inner and outer openings 44, 45 in one body, the strength of the opening 23 is further improved.

As the first cylindrical body 28 is partially surrounded by the second cylindrical body 30 and is made from the molten resin 41 of high rigidity, it is possible to provide the cross car beam 12 with high rigidity. Therefore, even if the cross car beam 12 is provided, on its lower surface at the center side in the vehicle-width direction, with the opening 71 for connection with the previously-mentioned HVAC system, it is possible to maintain the strength of the cross car beam 12 as a whole.

According to the support structure of the cross car beam of the aforementioned first embodiment, the car beam part on the driver's side which requires high rigidity in view of supporting the steering unit etc., is tightly formed by a double-pipe structure of the first cylindrical body 28 and the second cylindrical body 30 Additionally, the opening end of the second cylindrical body 30 outside the double-pipe structure is reinforced by the rib 25 effectively. That is, owing to the provision of the rib 25, it is possible to increase the strength of the second cylindrical body 30 at the opening end.

As shown in FIG. 9, as the side die 37 is provided with no draft angle, at its part that corresponds to the attachment part 26 of the rib 25, the opening end of the second cylindrical body 30 is parallel to a side surface 37a of the side die 37. Consequently, the fastening strength of the attachment part 26 with the support stay 16 can be improved.

[2$^{nd}$. Embodiment]

The second embodiment of the present invention will be described with reference to the drawings.

Figure 11:
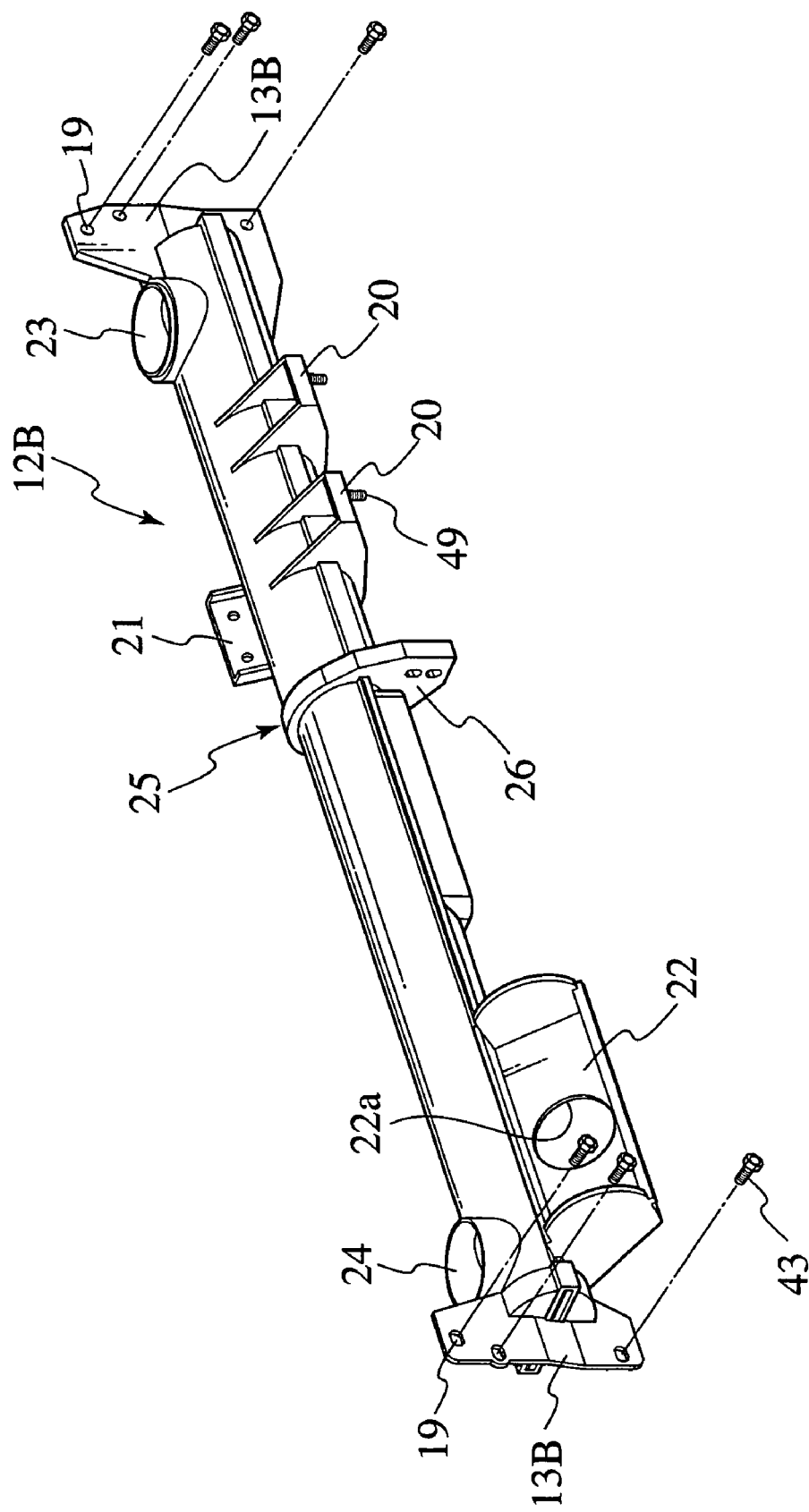
FIG. 11 is a perspective view of the whole cross car beam in accordance with the second embodiment of the present invention.

FIG. 11 is a perspective view of a cross car beam 12B in accordance with the second embodiment of the present invention. As mentioned above, the cross car beam 12B is provided, on both ends in the vehicle-width direction, with a pair of plate-shaped attachment flanges 13B, 13B extending outwardly in the vehicle-width direction. Each of the attachment flanges 13B, 13B has insertion holes 19 formed for insertion of bolts 43. On the driver's side of the cross car beam 12B, a pair of steering support brackets (i.e. steering support parts) 20, 20 are formed on the outer circumferential face (rear-side) of the car beam 12B to support a steering wheel (not shown). On the other hand, the cross car beam 12B is further provided, on the front side, with an attachment bracket 21.

Each of the steering support brackets 20, 20 has a tap-end stud bolt 49 formed to project downwardly by insert molding. On the other hand, the cross car beam 12B is provided, on the assistant driver's side, with an air-bag casing 22. On both right and left ends of the cross car beam 12B, a pair of cylindrical vent "blowout" ports 23, 24 are formed on the upper surface of the car beam 12B. In the vicinity of the center of the cross car beam 12B in the vehicle-width direction and on the driver's side, a rib 25 is formed around the car beam 12B, for connection with a support stay (not shown). The rib 25 is provided, rearward and obliquely downwardly, with an attachment part 26 for fixation with the support stay.

Figure 12:
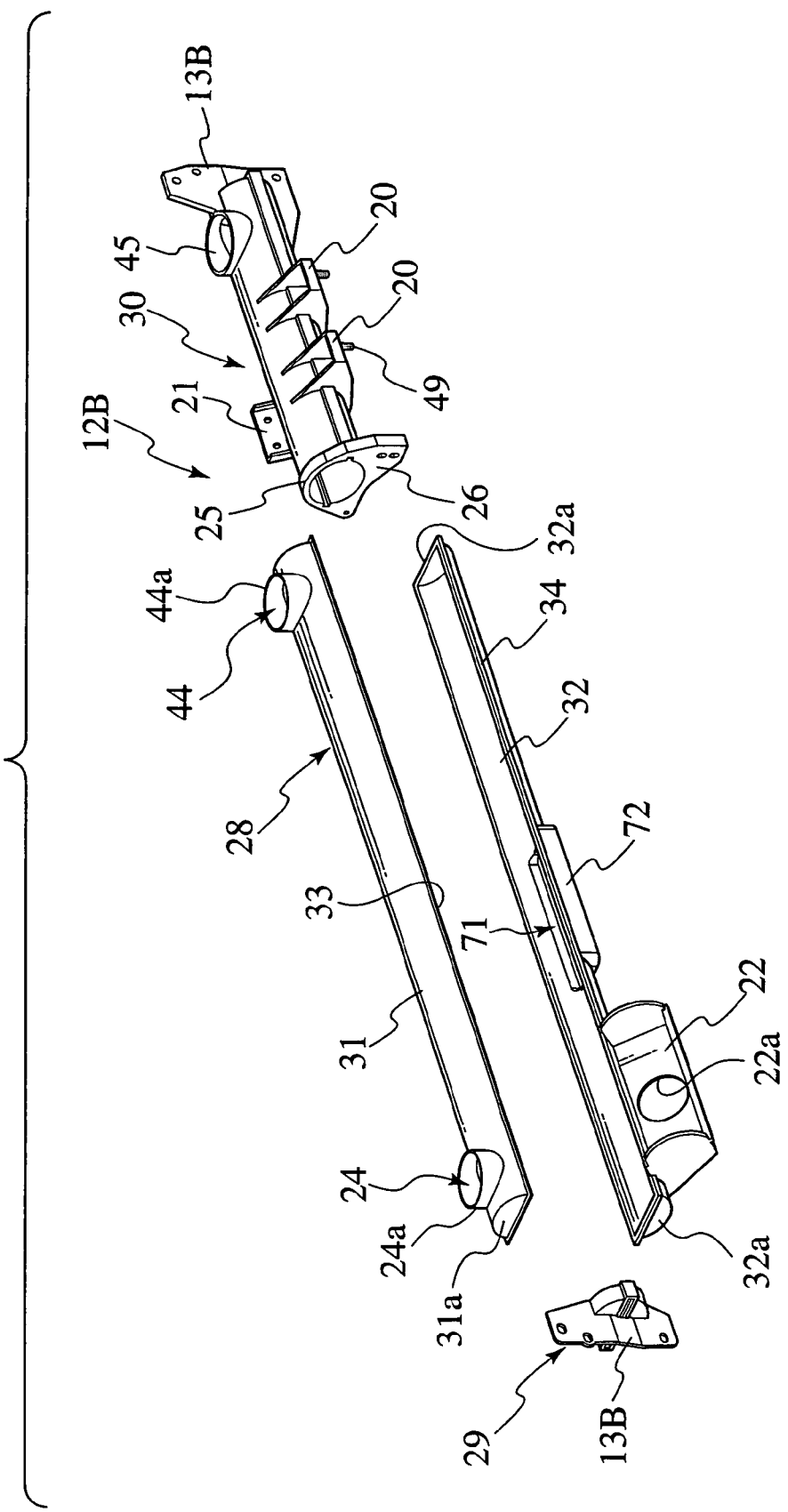
FIG. 12 is an enlarged perspective view of the cross car beam of the second embodiment.

FIG. 12 is an exploded perspective view of the cross car beam 12B of second embodiment of the present invention.

The cross car beam 12B includes a first cylindrical body 28 molded of resin previously, a lid member 29 arranged outside one end of the body 28B on the assistant driver's (left) side and also molded of resin by enveloped casting and a second cylindrical body 30 arranged outside one end of the cylindrical body 28 on the driver's (right) side and also molded of resin by enveloped casting.

The first cylindrical body 28 has an upper halved member 31 having a substantial U-shaped section on the driver's (right) side and a lower halved member 32 having a substantial U-shaped section throughout. In the longitudinal direction of the upper halved member 31, both ends thereof are closed by vertical walls 31a, 31a (only one shown in FIG. 12). Similarly, both longitudinal ends of the lower halved member 32 are closed by vertical walls 32a, 32a respectively. The upper halved member 31 is provided, on both sides in the longitudinal direction, with a pair of openings 44, 24 forming the vent "blowout" ports 23 (FIG. 13), 24. The opening 44 on the driver's (right) side is surrounded by a flange 44a projecting upwardly. While, the opening 24 is surrounded by a flange 24a projecting upwardly. Formed on the rear surface of the lower halved member 32 integrally is the above-mentioned air-bag casing 22 in the form of a bottomed box that opens obliquely upward and rearward. On the bottom of the casing 22, an opening 22b is formed to accommodate a not-shown disk-shaped inflator for air-bag.

In the second cylindrical body 30, its end on the interior (assistant driver's) side in the vehicle-width direction is opened. Around this open end, the above rib 25 is formed so as to project outward in the radial direction of the cross car beam 12B. While, the second cylindrical body 30 is provided, at its outer end in the vehicle-width direction, with a plate-shaped attachment flange 13B extending vertically. Near the attachment flange 13B, a blowout opening 45 having a flange projecting upwardly is formed on the top of the second cylindrical body 30. On the interior (assistant driver's) side of the opening 45 in the vehicle-width direction, the above-mentioned steering support brackets 20, 20 in pairs are formed on the rear surface of the second cylindrical body 30, in the form of bottomed boxes opening upwardly. While, the attachment bracket 21 is formed on the front surface of the second cylindrical body 30. These brackets 20, 20 and 21 are respectively formed integrally with the second cylindrical body 30. It is noted that the vent "blowout" port 23 of FIG. 13 has the blowout opening 44 of the first cylindrical body 28 and the blowout opening 45 of the second cylindrical body 30, providing a double-pipe structure in a tight manner.

Figure 13:
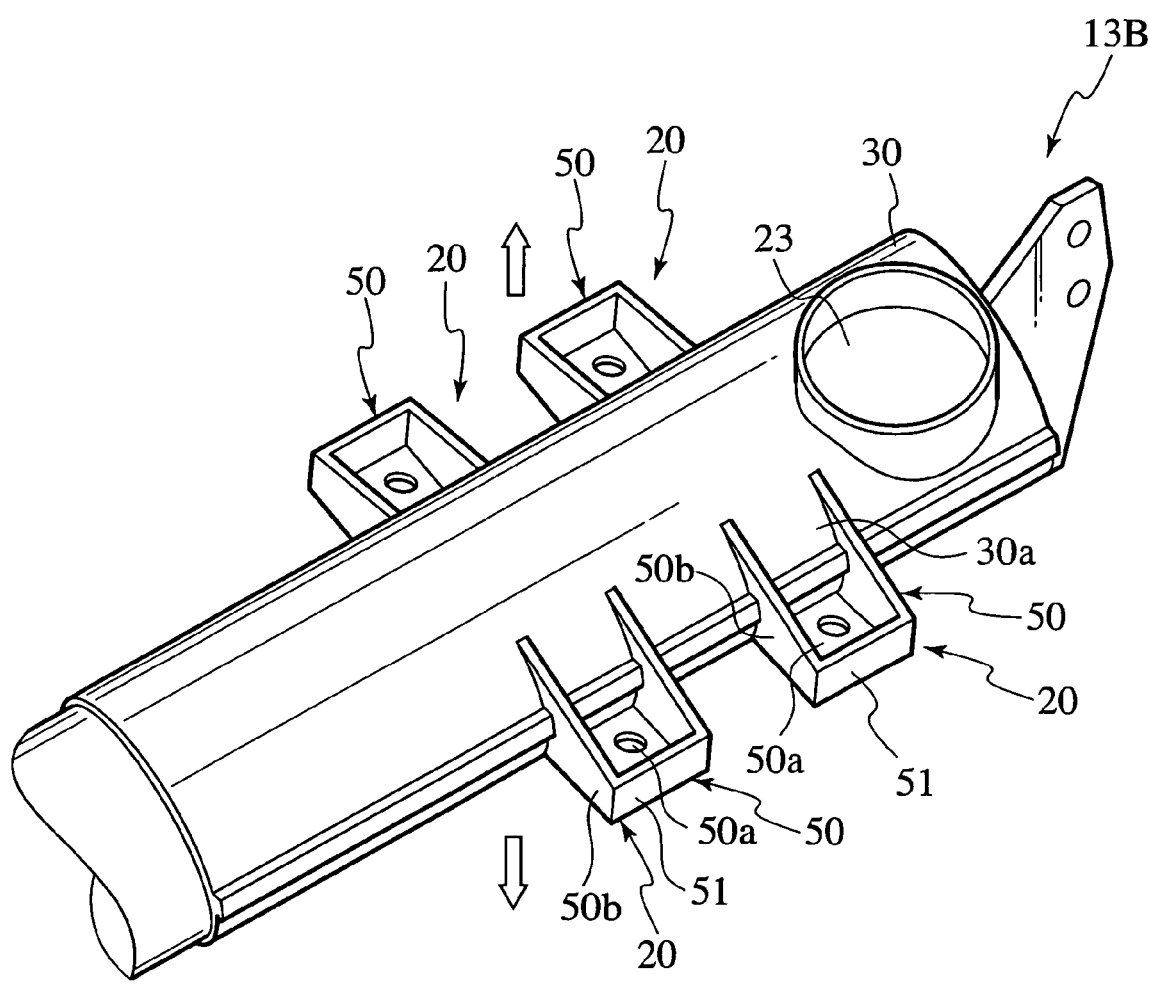
FIG. 13 is a perspective view of the cross car beam provided, on both front and rear sides of a vehicle, with brackets for supporting a steering.

As shown in FIGS. 12 and 13, on the circumferential surface of the second cylindrical body 30, there are integrally formed two steering support brackets 20, 20 projecting from the rear side of the body 30 backward of the vehicle and two steering support brackets 20, 20 projecting from the front side of the body 30 directing forward of the vehicle. In each side of the second cylindrical body 30, the steering support brackets 20, 20 are arranged apart from each other in the vehicle-width direction, at a predetermined interval.

On the rear side of the body 30, as shown in FIG. 13, each steering support bracket 20 includes a substantial U-shaped (or H-shaped) body part 50 extending from the outer circumferential surface 30a on the rear side of the body 30 rearward and a sidewall part 51 that closes an opening end of the body part 50 on the rear side of the vehicle. The body part 50 comprises a bottom part (plate) 50a arranged substantially horizontally and a pair of sidewalls 50b, 50b standing from both left and right ends of the bottom part 50a, providing a substantial U-shaped section. Thus, by the outer circumferential surface 30a, the bottom part 50a, the sidewalls 50b, 50b and the sidewall part 51, the bracket 20 is provided in the form of a substantial lid (or box) opening upward. In the bottom part 50a, a tap-end stud bolt (fastening member) 49 is formed so as to project downwardly by insert molding. The top of the stud bolt 49 is in a substantial plane with the bottom part 50a.

As shown in FIG. 13, not only provided on the rear side of the second cylindrical body 30, the steering support bracket 20 may be arranged on the outer circumferential surface of the body 30 on the front side.

Figure 14:
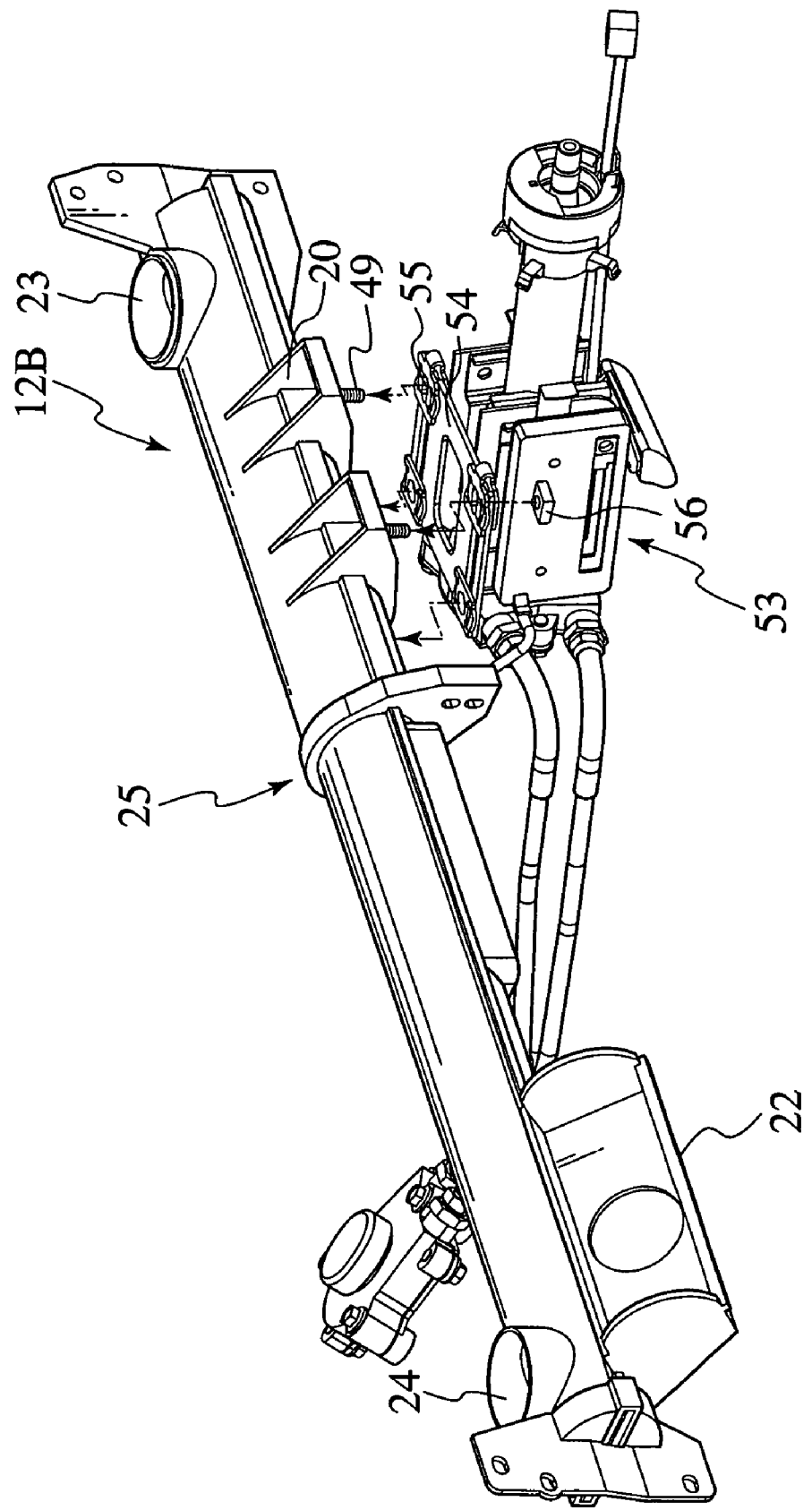
FIG. 14 is a perspective view showing a state to attach a steering unit to the cross car beam of the second embodiment.

As shown in FIG. 14, a steering unit 53 can be attached to the steering support brackets 20 of the cross car beam 12B from its underside.

As mentioned before, the stud bolts 49 are arranged to extend from the steering support brackets 20, 20 downwardly. To the contrary, a flattened attachment surface 54 is formed in the upper part of the steering unit 53. The attachment surface 54 is provided, at corners thereof, with insertion holes 55 into which the stud bolts 49 are to be inserted.

In assembling, it is firstly performed to lift up the steering unit 53 and successively insert the stud bolts 49 into the insertion holes 55. Subsequently, with thread-engagement of a nut 56 with each of the stud bolts 56, the steering unit 53 can be supported by the cross car beam 12B.

According to the embodiment, owing to the double-pipe structure of the first cylindrical body 28 and the second cylindrical body 30 in a tight manner, it is possible to reinforce the vicinities of the steering supporting part of the cross car beam 12B that requires high rigidity in view of supporting the steering unit 53 etc., effectively.

Further noted that the cross car beam 12B of this embodiment is subjected to a downward load through the steering brackets 20, 20. However, the downward load is dispersed to the attachment flanges 13B, 13B, the attachment bracket 21 and the attachment part 26 for the supporting stay uniformly. Regarding the lid member 29 that is provided in one body with the first cylindrical body 28 by enclosed casing, the enclosed casing area is relatively small in comparison with that of the second cylindrical body 30 since the rigidity required for the lid member 29 is smaller than that for the second cylindrical body 30. Additionally, since the air-bag casing 22 is formed in one body with the lower halved member 32, it is possible to reduce the number of components required for the installation of an air-bag unit.

Further, if the draft directions of the upper and lower dies 35, 36 are established to be vertical, then it is possible to hold the stud bolts 49 down effectively, allowing them to be formed integrally with the steering brackets 20 by insert molding.

[3rd. Embodiment]

The third embodiment of the present invention will be described below.

Figure 15:
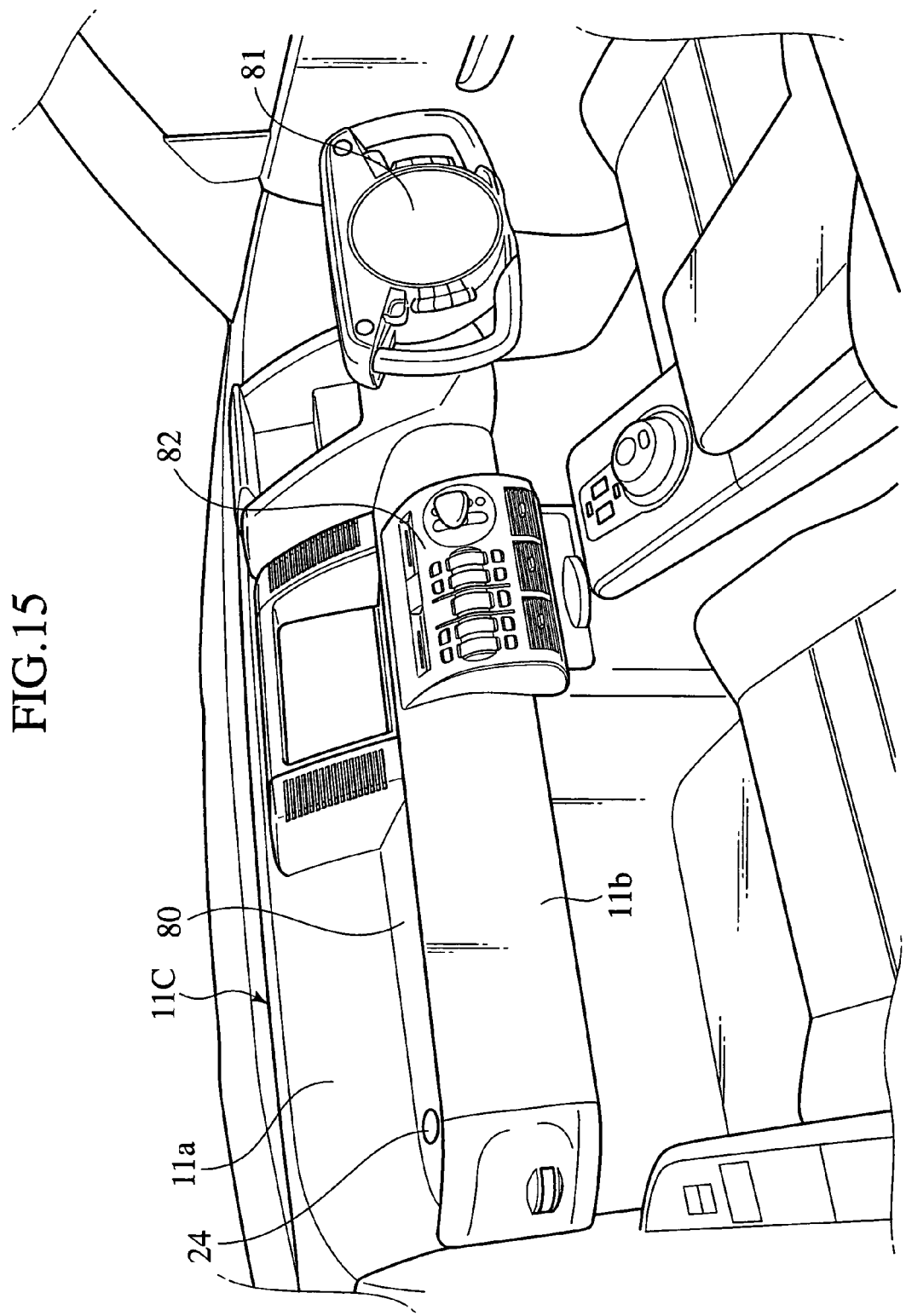
FIG. 15 is a perspective view of the front part of a vehicle body where a cross car beam in accordance with the third embodiment of the present invention.

FIG. 15 shows the front part of a vehicle cabin equipped with a cross car beam for a vehicle of this embodiment.

In the front part of the vehicle cabin, an instrument panel 11 of this embodiment is arranged to extend from the driver's side to the assistant driver's side along a vehicle-width direction. This instrument panel 11 includes a front instrument panel 11a on the front side of the vehicle and a rear instrument panel 11b on the rear side of the vehicle. Additionally, on the assistant driver's side, there is horizontally arranged a decorative surface 80 of a later-mentioned cross car beam 12c, between the front instrument panel 11a and the rear instrument panel 11b. This decorative surface 80 forms part of the surface of the instrument panel 11. Noted that, in the vehicle cabin, a steering unit 81 is arranged on the driver's side, while a switch panel 82 is arranged at the intermediate part in the vehicle-width direction.

Figure 16:
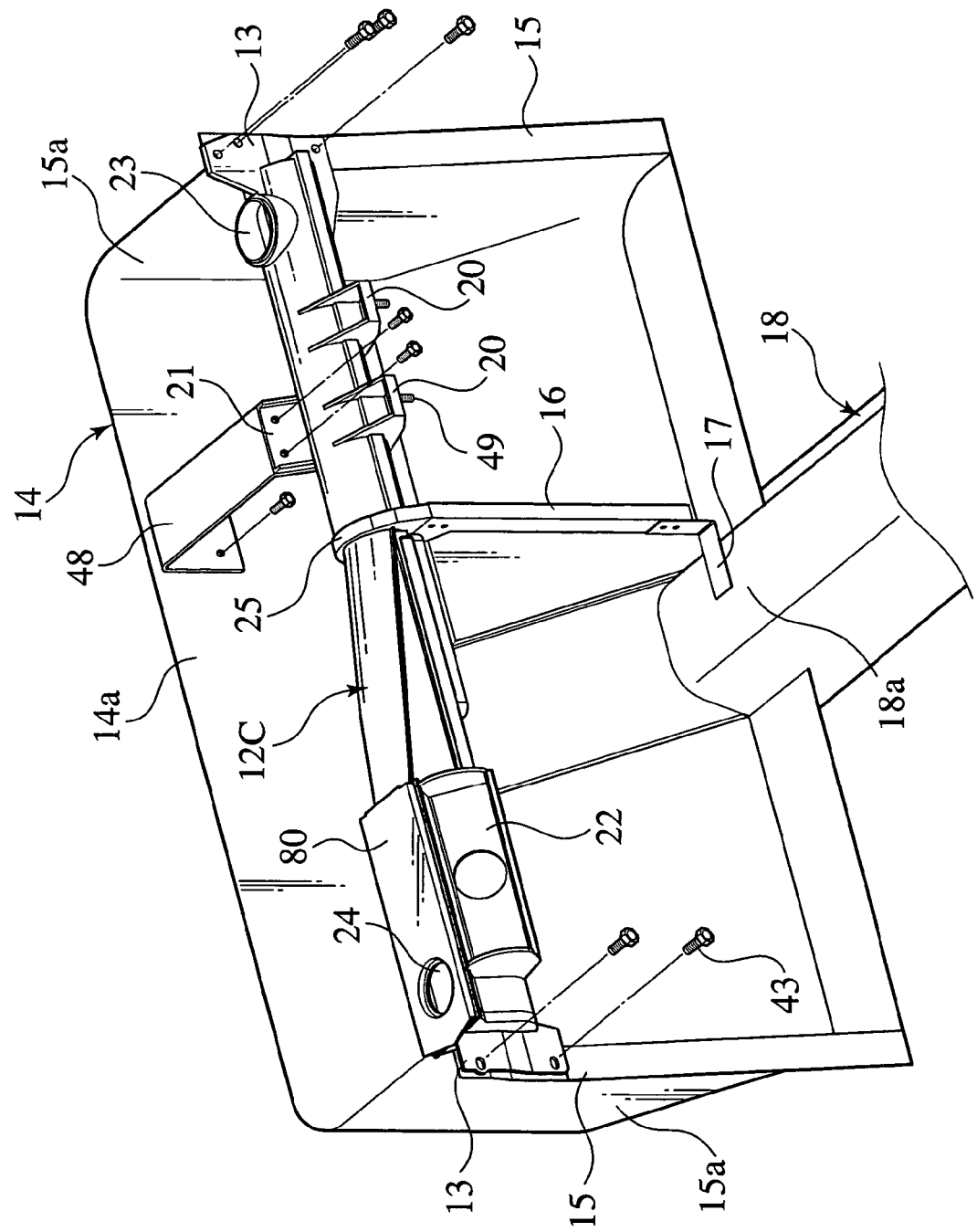
FIG. 16 is a respective view showing the mount arrangement of the cross car beam where an instrument panel of FIG. 15 is detached.

As shown in FIG. 16, inside the instrument panel 11 and between the front instrument panel 11a and the rear instrument panel 11b, the cross car beam 12C is arranged so as to extend from the driver's side to the assistant driver's side in the vehicle-width direction. The cross car beam 12C is provided, on both right and left sides thereof, with attachment flanges 13, 13. The dash lower panel 14 is arranged in front of the cross car beam 12C. The dash floor panel 14 is provided, on both sides thereof in the vehicle-width direction, with the side panel parts 15a, 15a each having the attachment flanges 15, 15 folded to extend from respective rear edges of the side panels 15a, 15a to an out-vehicle direction. The above attachment flanges 13, 13 of the cross car beam 12C are fastened to the attachment flanges 15, 15 by means of the bolts 43. Additionally, the cross car beam 12C is supported, on its center side, by the upper surface 18a of the tunnel part 18 of a floor panel through the support stay 16 and the attachment bracket 17. On the driver's side of the vehicle (e.g. the right-hand side of FIG. 2), the attachment bracket 21 is fixed to the front-side of the cross car beam 12C. The attachment bracket 21 is attached to the rear face 14a of the dash lower panel 14 through the support bracket 48 having U-shaped section in side view.

Figure 17:
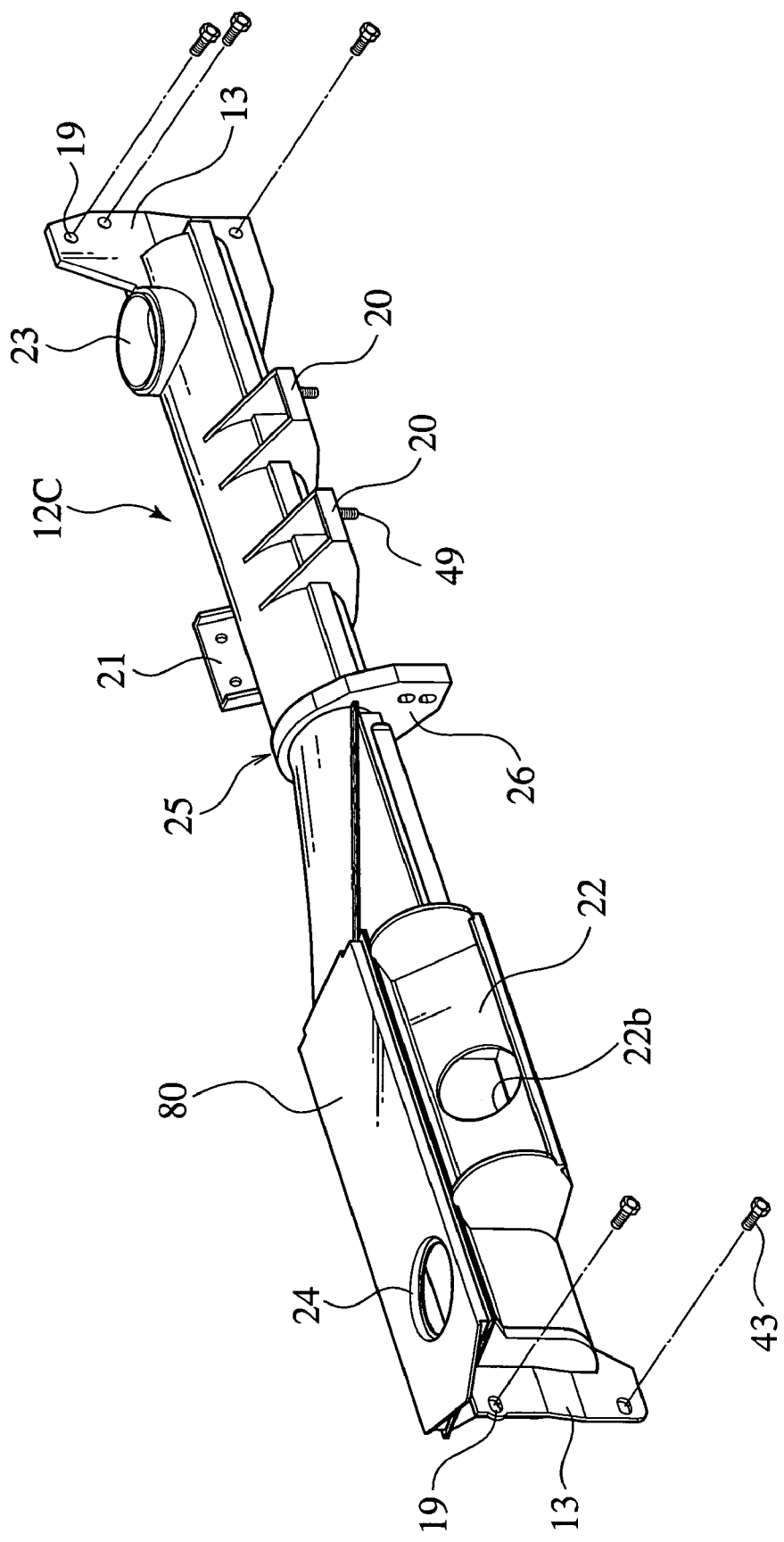
FIG. 17 is a perspective view showing the whole cross car beam of the third embodiment.

FIG. 17 is a perspective view of the cross car beam 12C of this embodiment. As mentioned above, the cross car beam 12C is provided, on both ends in the vehicle-width direction, with the plate-shaped attachment flanges 13, 13 extending outwardly in the vehicle-width direction. Each of the attachment flanges 13, 13 has insertion holes 19 formed for insertion of the bolts 43. The cross car beam 12C is provide, on the driver's side, with the steering support brackets (i.e. steering support parts) 20, 20 for supporting the steering unit 81 (see FIG. 15) on the outer circumferential face (rear-side) of the beam 12C. As mentioned above, the cross car beam 12C is further provided, on the front side, with the attachment bracket 21 for fixing the cross car beam 12C to the dash lower panel 14. Each of the steering support brackets 20, 20 has a tap-end stud bolt 49 formed to project downwardly by insert molding. On the other hand, the cross car beam 12C is provided, on its rear face on the assistant driver's side, with the air-bag casing 22. On both right and left ends of the cross car beam 12C, the cylindrical vent "blowout" ports 23, 24 are formed on the upper surface of the beam 12C. Noted that, in the rib 25 of the cross car beam 12C on the driver's side, an attachment part 26 for attachment to a supporting member is formed to extend from the main body of the beam 12C rearward and obliquely downwardly.

Figure 18:
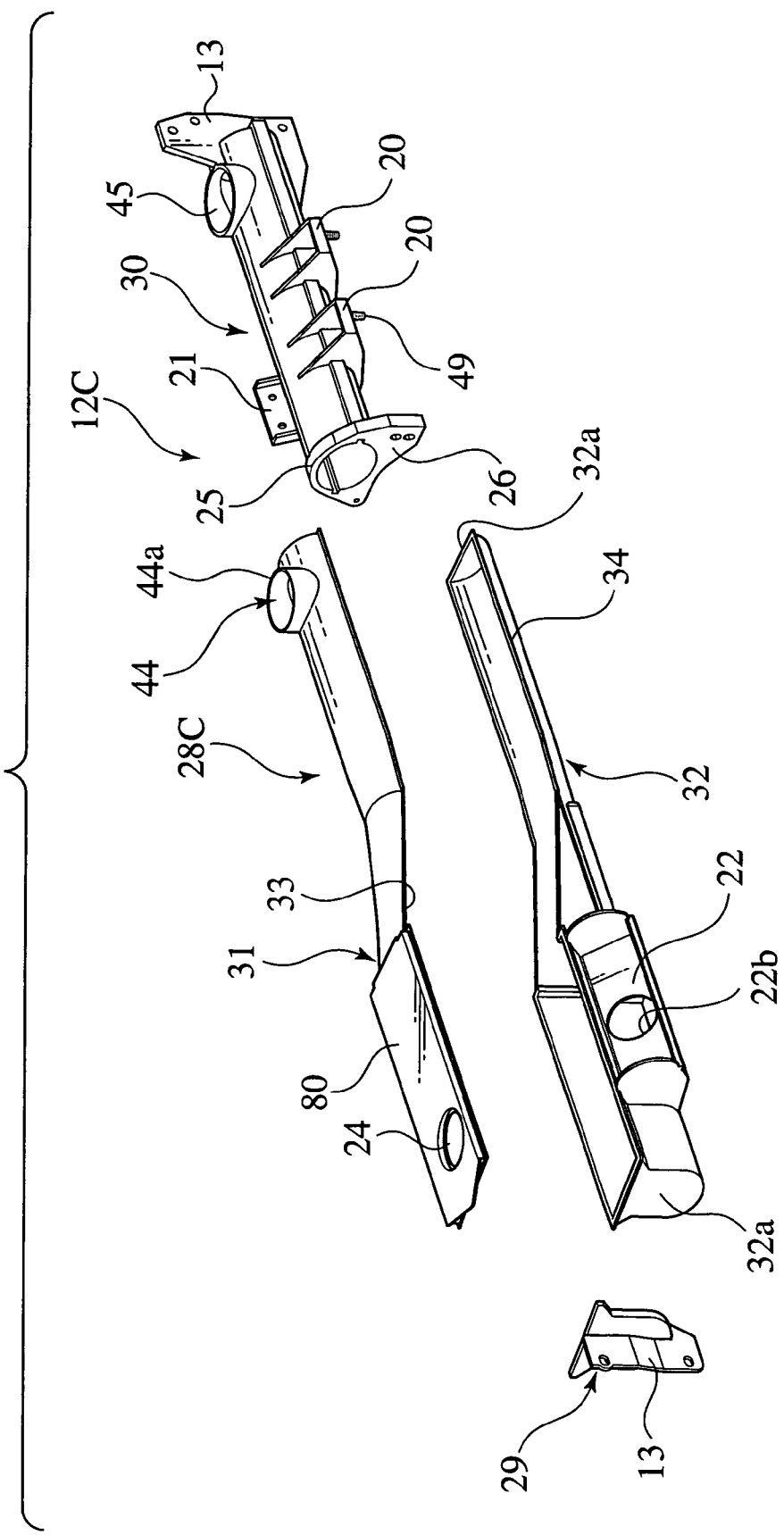
FIG. 18 is an exploded perspective view of the cross car beam of the third embodiment.

FIG. 18 is an exploded perspective view of the cross car beam 12C of third embodiment of the present invention.

The cross car beam 12C includes a first cylindrical body 28C molded of resin previously, the lid member 29 arranged outside one end of the body 28C on the assistant driver's (left) side and also molded of resin by enveloped casting and the cylindrical reinforcing body 30 (i.e. the second cylindrical body) arranged outside one end of the cylindrical body 28C on the driver's (right) side and also molded of resin by enveloped casting.

The cylindrical body 28C has an upper halved member 31 having a substantial U-shaped section on the driver's (right) side and a lower halved member 32 having a substantial U-shaped section throughout. On the driver's side, the upper halved member 31 has an end closed by a vertical wall 32a. While, both longitudinal ends of the lower halved member 32 are closed by vertical walls 32a, 32a respectively. The upper halved member 31 is provided, on both sides in the longitudinal direction, with vent "blowout" openings 44, 24. The opening 44 on the driver's (right) side is surrounded by a flange 44a projecting upwardly. On the rear surface of the lower halved member 32, the above-mentioned air-bag casing 22 is formed in one body with the member 32, in the form of a bottomed box. On the bottom of the casing 22, an opening 22b is formed to accommodate a not-shown disk-shaped inflator for air-bag.

On the other hand, the cylindrical reinforcing body 30 is provided, inside in the vehicle-width direction, with an opened end around which the rib 25 is formed over the whole circumference so as to project radially outward of the cross car beam 12C. While, the cylindrical reinforcing body 30 is provided, at its outer end in the vehicle-width direction, with the plate-shaped attachment flange 13 extending vertically. Near the attachment flange 13 and on the top of the cylindrical reinforcing body 30, a blowout opening 45 is provided with a flange projecting upwardly. On the rear surface of the reinforcing body's part (30) in the vicinity of the opening 45, the above steering support brackets 20, 20 in pairs are arranged in the form of bottomed boxes opening upwardly. While, the attachment bracket 21 is formed on the front surface of the reinforcing body's part (30) in the vicinity of the opening 45. These brackets 20, 20 and 21 are respectively formed integrally with the cylindrical reinforcing body 30. It is noted that the vent "blowout" port 23 of FIG. 17 has the blowout opening 44 of the cylindrical body 28C and the blowout opening 45 of the cylindrical reinforcing body 45, providing a double-pipe structure fitted tightly.

Figure 19:
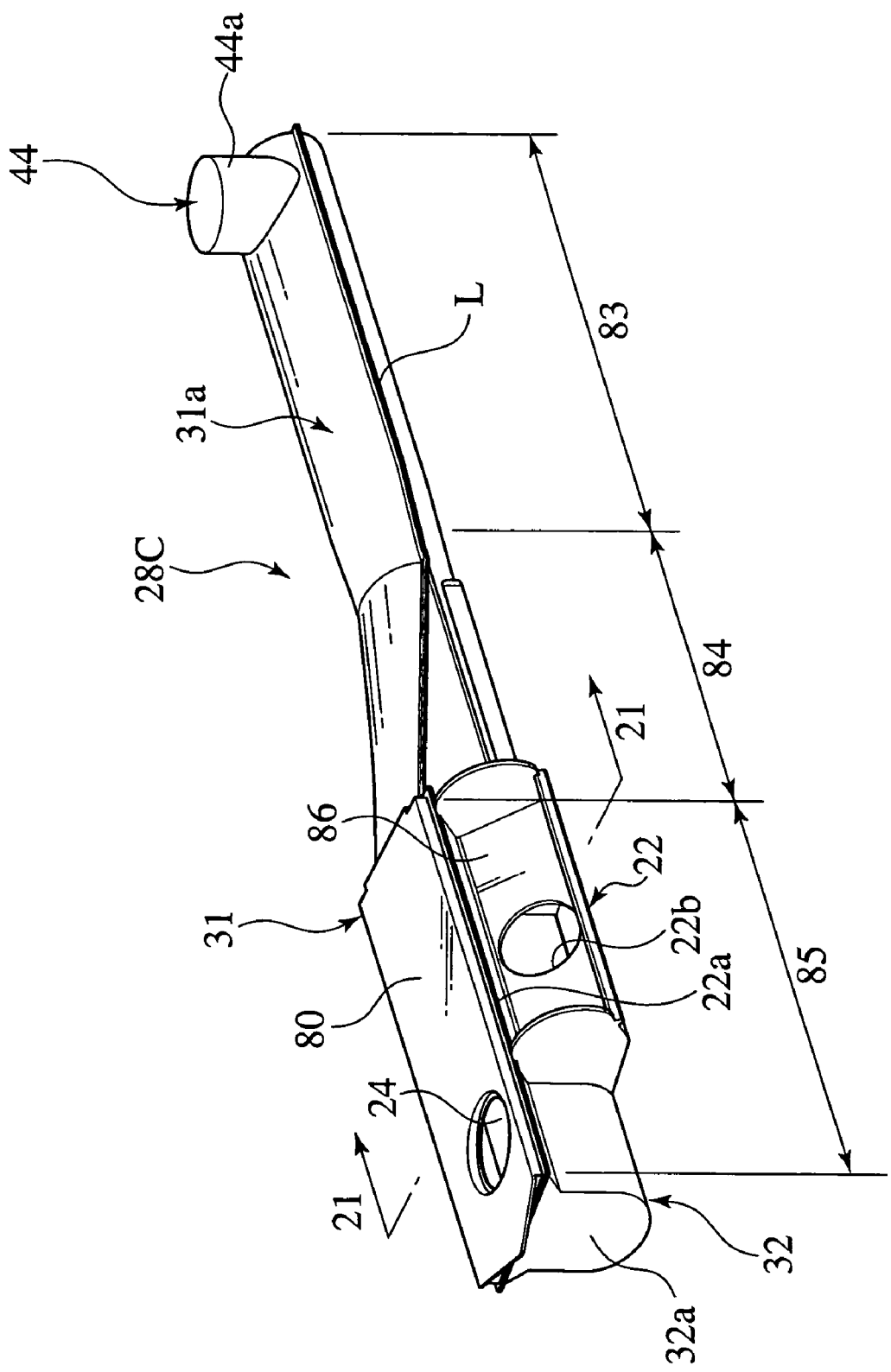
FIG. 19 is a perspective view of a cylindrical body forming the cross car beam of the third embodiment.
Figure 20:
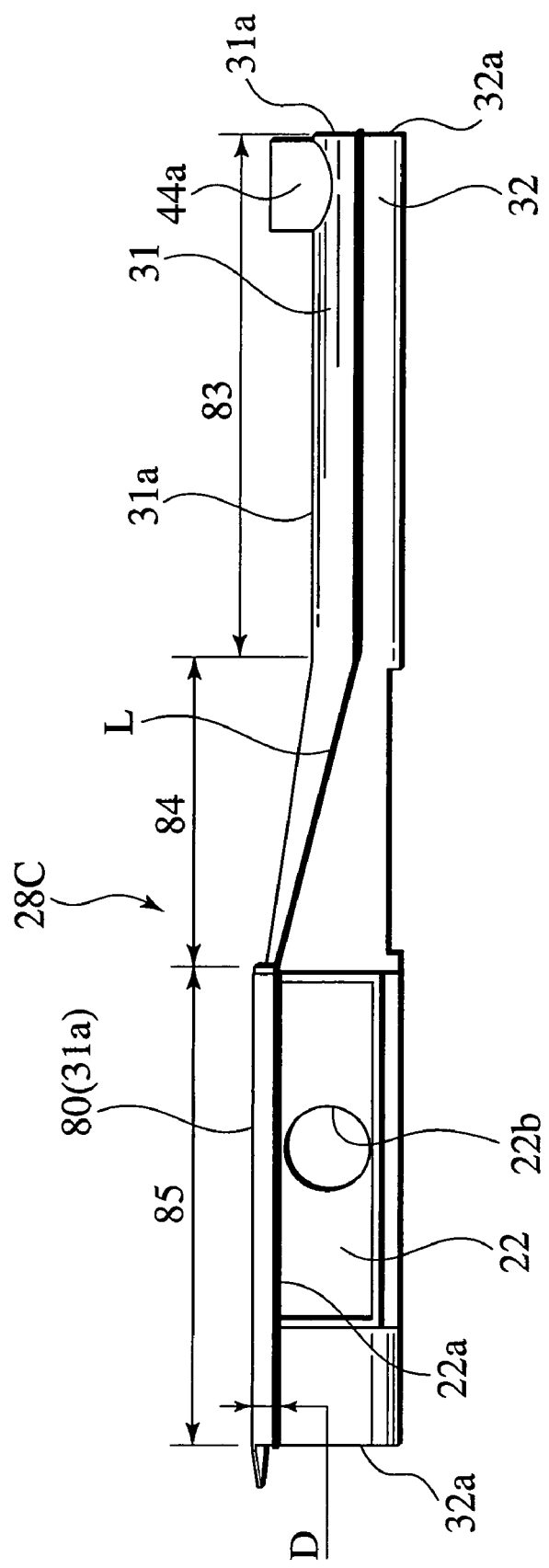
FIG. 20 is a sectional view showing a parting line of the cylindrical body of the third embodiment.

FIG. 19 is a perspective view of the cylindrical body 28C. FIG. 20 is a front view of the cylindrical body 28C. As shown in the figures, a parting line L between the upper halved member 31 and the lower halved member 32 is positioned at the center in the vertical direction of the vehicle on a driver's (right) side 83, slanted obliquely upward in an intermediate part 84 in the vehicle-width direction and further arranged along a top end 22a of the casing 22 substantially horizontally on an assistant driver's (left) side 85. Noted that an upper surface 31a of the upper halved member 31 is also formed substantially horizontally on the driver's side 83, gradually slanted obliquely upward in the intermediate part 84 in the vehicle-width direction and also formed substantially horizontally on the assistant driver's side 85 to provide the above decorative surface 80. That is, as shown in FIG. 20, since the parting line L on the assistant driver's side is arranged along the decorative surface 80 as being the upper surface 31a of the upper halved member 31, it has a substantially constant thickness D along the vehicle-width direction, Additionally, as shown in FIG. 21, an attachment surface 86 of the air-bag casing 22 is inclined so as to rise upward as directing the front of the vehicle.

The operation and effect of the above-constructed cross car beam will be described below.

First, as the thickness D of the upper halved member 31 is generally constant on the assistant driver's side 85, the flow of molten resin is uniformized during the molding of the halved member 31, whereby it is possible to form the decorative surface 80 smoothly.

Figure 21:
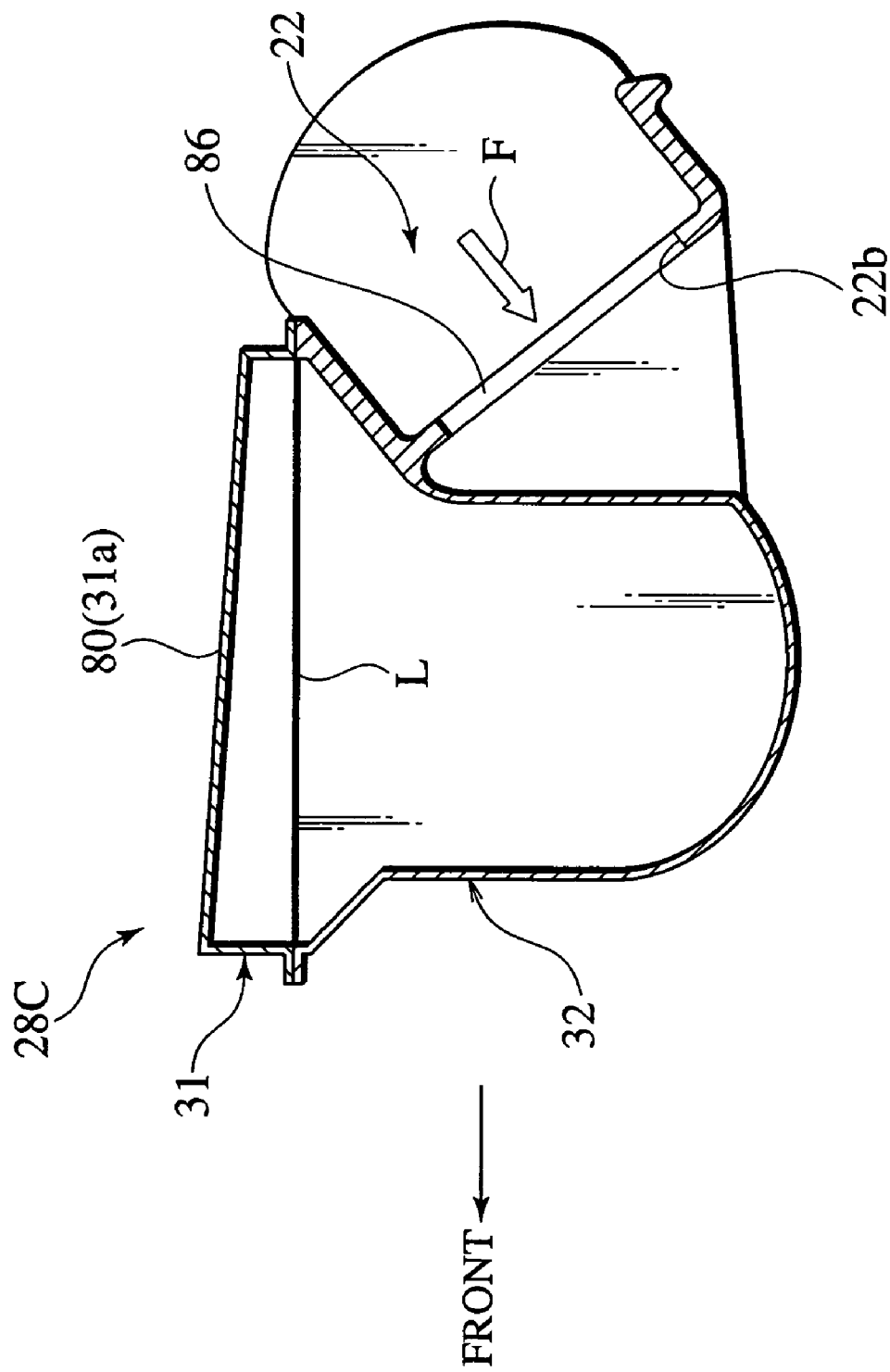
FIG. 21 is a sectional view taken along a line 21—21 of FIG. 19.

As shown in FIG. 21, when the vehicle has a collision, an air bag (not shown) is activated to expand in a short time. At the same time, a passenger is forced on the air bag. Then, a load F is applied to the attachment surface 86 substantially perpendicularly. Nevertheless, since the air-bag casing 22 itself is formed integrally with the halved member 32, it is possible to provide the casing 22 with a designated strength in spite of its thinness. Again noted, the air-bag casing 22 is formed in one body with the lower halved member 32. Accordingly, the rigidity of the air-bag casing 22 can be improved furthermore.

The forming method of the cross car beam 12C will be described in brief.

First of all, it is performed to mold the cylindrical body 28C. Previously, by injection molding, the upper halved member 31 and the lower halved member 32 (see FIG. 18) are made from different resins independently. Thereafter, by welding respective peripheries 33, 34 of the members 31, 32 to each other in vibrations, the hollow cylindrical body 28C is completed.

Next, by enveloped casing, the lid member 29 and the cylindrical reinforcing body 30 of resins are molded on the circumferences of both ends of the cylindrical body 28C respectively.

That is, after positioning the previously-formed cylindrical body 28 in a molding die, a cavity therein is supplied and filled up with molten resin. From this state, as the molten resin hardens in the cavity, the cylindrical reinforcing body 30 is formed on the circumference of the cylindrical body 28C by enveloped casting. Here, it is desirable that the above molten resin has strength (in solid state) larger than that of the resin forming the cylindrical body 28C. For example, molten resin mixed with fibers is preferable for the cylindrical reinforcing body 30.

In the cross car beam 12C, according to this embodiment, its part on the driver's side that is required to have high rigidity in view of supporting a steering etc. is formed by both of the cylindrical body 28C and the cylindrical reinforcing body 30 in tight junction, providing a double-pipe structure.

Finally, it will be understood by those skilled in the art that the foregoing descriptions are nothing but some embodiments of the disclosed cross car beam for a vehicle. Besides these embodiments, various changes and modifications may be made to the present invention without departing from the scope of the invention.

What is claimed is:

1. A cross car beam for a vehicle, comprising:
    a first cylindrical body arranged along a vehicle-width direction so as to extend from a driver's side to an assistant driver's side; and
    a second cylindrical body, which is arranged on an outer circumference of a driver's side part of the first cylindrical body and which is tightly provided around the first cylindrical body, thereby providing the cross car beam with a double-pipe structure of the first cylindrical body and the second cylindrical body,
    wherein at least one of an end of the first cylindrical body on the assistant driver's side thereof and an end of the second cylindrical body on the driver's side thereof is provided with an attachment part,
    wherein the attachment part is formed to be fixable to a constituent member of a vehicle body, and
    wherein the attachment part has a honeycomb structure.

2. The cross car beam of claim 1, wherein the honeycomb structure has a plurality of plate ribs that are formed so as to extend from an axis of the first cylindrical body or an axis of the second cylindrical body in a radial direction.

3. The cross car beam of claim 1, wherein the first cylindrical body and the second cylindrical body are respectively provided, on their circumferential surfaces close to the attachment part, with vent blowout ports that communicate with the interior of the first cylindrical body and the interior of the second cylindrical body, respectively.

4. The cross car beam of claim 1, further comprising a steering supporting part that is arranged in the vicinity of the attachment part to support a steering unit of the vehicle.

5. The cross car beam of claim 1, further comprising a rind member adapted so as to envelop an outer periphery of the end of the first cylindrical member on the assistant driver's side, wherein the attachment part is arranged on an end of the rind member, and wherein the second cylindrical member is provided, on the end on the driver's side, with another attachment part.

6. A cross car beam for a vehicle, comprising:
a first cylindrical body arranged along a vehicle-width direction so as to extend from a driver's side to an assistant driver's side;
a second cylindrical body, which is arranged on an outer circumference of a driver's side part of the first cylindrical body and which is tightly provided around the first cylindrical body, thereby providing the cross car beam with a double-pipe structure of the first cylindrical body and the second cylindrical body; and
a support member,
wherein the second cylindrical body is provided, on a periphery thereof, with a rib that has an attachment part for the support member, and
wherein the support member has a first end attached to the attachment part and a second end fixed to a constituent member of a vehicle body, whereby an intermediate part of the cross car beam in a vehicle-width direction is supported by the constituent member through the support member.

7. The cross car beam of claim 6, wherein the rib is formed on an inside end of the second cylindrical body in a vehicle-width direction.

8. The cross car beam of claim 6, wherein the attachment part for the supporting member is arranged, in the rib, on the lower side of the second cylindrical body.

9. A cross car beam for a vehicle, comprising:
a first cylindrical body arranged along a vehicle-width direction so as to extend from a driver's side to an assistant driver's side; and
a second cylindrical body, which is arranged on an outer circumference of a driver's side part of the first cylindrical body and which is tightly provided around the first cylindrical body, thereby providing the cross car beam with a double-pipe structure of the first cylindrical body and the second cylindrical body,
wherein the first cylindrical body is provided, on an intermediate part thereof in a vehicle-width direction, with an opening for connection with an air conditioning unit.

10. A cross car beam for a vehicle, comprising:
a first cylindrical body arranged along a vehicle-width direction so as to extend from a driver's side to an assistant driver's side; and
a second cylindrical body, which is arranged on an outer circumference of a driver's side part of the first cylindrical body and which is tightly provided around the first cylindrical body, thereby providing the cross car beam with a double-pipe structure of the first cylindrical body and the second cylindrical body,
wherein the first cylindrical body is provided, on the driver's side thereof, with a steering supporting part to support a steering unit of the vehicle, and
wherein the driver's side part of the first cylindrical body, which is close to the steering supporting part, is formed together with the second cylindrical body to provide the double-pipe structure.

11. A cross car beam for a vehicle, comprising:
a first cylindrical body arranged along a vehicle-width direction so as to extend from a driver's side to an assistant driver's side; and
a second cylindrical body, which is arranged on an outer circumference of a driver's side part of the first cylindrical body and which is tightly provided around the first cylindrical body, thereby providing the cross car beam with a double-pipe structure of the first cylindrical body and the second cylindrical body,
wherein the first cylindrical body is made of a first synthetic resin and the second cylindrical body is made of a second synthetic resin, and
wherein the strength of the second synthetic resin is greater than the strength of the first synthetic resin.

12. A cross car beam for a vehicle, comprising:
a first cylindrical body arranged along a vehicle-width direction so as to extend from a driver's side to an assistant driver's side; and
a second cylindrical body, which is arranged on an outer circumference of a driver's side part of the first cylindrical body and which is tightly provided around the first cylindrical body, thereby providing the cross car beam with a double-pipe structure of the first cylindrical body and the second cylindrical body,
wherein the first cylindrical body is formed by an upper halved member on the upside of the vehicle and a lower halved member on the downside of the vehicle, and
wherein the upper and lower halved members are welded together.

13. A cross car beam for a vehicle, comprising:
a first cylindrical body arranged along a vehicle-width direction so as to extend from a driver's side to an assistant driver's side; and
a second cylindrical body, which is arranged on an outer circumference of a driver's side part of the first cylindrical body and which is tightly provided around the first cylindrical body, thereby providing the cross car beam with a double-pipe structure of the first cylindrical body and the second cylindrical body,
wherein the second cylindrical body is provided with a steering support member that projects in a fore-and-aft direction of the vehicle, and
wherein the steering support member is formed by a plate that extends from a peripheral surface of the second cylindrical body in the fore-and-aft direction of the vehicle and a sidewall part formed around the plate.

14. The cross car beam of claim 13, wherein a steering unit is supported on a lower surface of the steering support member, and wherein a part of the double-pipe structure in the vicinity of the steering support member has a vent blowout port open on an upper part of the double-pipe structure.

15. The cross ear beam of claim 13, wherein the steering support member is arranged on the peripheral surface of the second cylindrical body, on both sides in the vehicle fore-and-aft direction.

16. The cross car beam of claim 13, wherein the steering support member has a fastening member molded therewith, wherein the fastening member projects downwardly for attaching a steering unit, and wherein the steering support member supports the steering unit.

17. A cross car beam for a vehicle, comprising:
 a first cylindrical body arranged along a vehicle-width direction so as to extend from a driver's side to an assistant driver's side; and
 a second cylindrical body, which is arranged on an outer circumference of a driver's side part of the first cylindrical body and which is tightly provided around the first cylindrical body, thereby providing the cross car beam with a double-pipe structure of the first cylindrical body and the second cylindrical body,
 wherein the first cylindrical body is formed by halved members, and
 wherein one of the halved members is provided with an air-bag attachment member.

18. The cross car beam of claim 17,
 wherein the first cylindrical body is formed so that an upper surface thereof on an assistant driver's side becomes higher than the upper surface thereof on a driver's side,
 wherein the first cylindrical body is formed by an upper halved member on an upside of the vehicle and a lower halved member on a downside of the vehicle,
 wherein the upper and lower halved member are welded together,
 wherein the air-bag attachment member is provided on the assistant driver's side of the lower halved member, and
 wherein a parting line between the upper halved member and the lower halved member is arranged, on the driver's side, at a central part of the first cylindrical body in a vertical direction and also arranged, on the assistant driver's side, above the air-bag attachment member.

19. The cross car beam of claim 18, wherein the parting line on the assistant driver's side is arranged along the upper surface of the first cylindrical body.

20. The cross car beam of claim 17, wherein an upper surface of the first cylindrical body on the assistant driver's side forms a part of a surface of an instrument panel.

21. A cross car beam for a vehicle, comprising:
 a first cylindrical body arranged along a vehicle-width direction so as to extend from a driver's side to an assistant driver's side; and
 a second cylindrical body, which is arranged on an outer circumference of a driver's side part of the first cylindrical body and which is tightly provided around the first cylindrical body, thereby providing the cross car beam with a double-pipe structure of the first cylindrical body and the second cylindrical body,
 wherein the first cylindrical body has an opening that is configured to be connected to an air conditioning unit so that an inner space of the first cylindrical body serves as an air duct.

* * * * *